(12) United States Patent  (10) Patent No.: US 7,891,877 B2
Nomi et al.  (45) Date of Patent: Feb. 22, 2011

(54) CIRCULAR ARC SLIDE APPARATUS

(75) Inventors: Kazunori Nomi, Shika-machi (JP);
Makoto Kadoya, Shika-machi (JP);
Katsunori Hoshiba, Shika-machi (JP);
Masaharu Omori, Shika-machi (JP)

(73) Assignee: Sigma Koki Co., Ltd., Tokyo (JP)

( * ) Notice: Subject to any disclaimer, the term of this patent is extended or adjusted under 35 U.S.C. 154(b) by 468 days.

(21) Appl. No.: 12/076,507

(22) Filed: Mar. 19, 2008

(65) Prior Publication Data
US 2008/0240640 A1 Oct. 2, 2008

(30) Foreign Application Priority Data
Mar. 28, 2007 (JP) ............... 2007-085900

(51) Int. Cl.
*F16C 29/06* (2006.01)

(52) U.S. Cl. ......................... 384/49; 384/445

(58) Field of Classification Search .................. 384/45, 384/49, 7, 9, 451, 445; 451/52; 33/1 N, 33/569, 570, 573; 269/60, 61, 71, 73, 75; 29/898.03
See application file for complete search history.

(56) References Cited

U.S. PATENT DOCUMENTS 4,644,702 A * 2/1987 Teramachi .................. 384/49

6,705,019 B2 * 3/2004 Mauro ......................... 33/569

FOREIGN PATENT DOCUMENTS

JP 09021415 A * 1/1997
JP 2005003080 A * 1/2005

* cited by examiner

*Primary Examiner*—Thomas R Hannon
(74) *Attorney, Agent, or Firm*—Oliff & Berridge, PLC

(57) ABSTRACT

A circular arc slide apparatus that achieves improved precision and a reduction in costs is provided. The circular arc slide apparatus comprises a lower plate, an upper plate, and a circular arc track provided between the lower plate and upper plate. Guide rail portions are provided in an upper surface of the lower plate and a lower surface of the upper plate, and circular arc curve-shaped guide grooves that constitute the circular arc track are provided in opposing planar surfaces of the guide rail portions. The guide groove cross-section describes a circular arc-shape, and a plurality of balls are rollably fitted between the opposing guide grooves in a preloading state. The lower plate and upper plate are integrally machined from a plate-like material and formed in a shape comprising the guide rail portions and guide grooves, and the inner surface of each guide groove is configured as a machined face produced by an end mill. The depth of each guide groove is set to a dimension machinable by a tip semi-circular cutting blade portion of an end mill, the rotation axis of which is diagonally set that is no more than 0.146 times the diameter of the balls.

12 Claims, 24 Drawing Sheets

Related Art

CIRCULAR ARC SLIDE APPARATUS

BACKGROUND OF THE INVENTION

1. Field of the Invention

The present invention relates to a circular arc slide apparatus in which an upper plate (also referred to as a movable member) is able to be smoothly motioned in a circular arc along a circular arc track set in a motion reference plane perpendicular to a lower plate (also referred to as a base member).

2. Description of the Related Art

Circular arc slide apparatuses (also referred to as circular arc motion stages or simply as slide apparatuses) are used in laboratories or the like to precisely motion laboratory instruments and materials on which laboratory research is being undertaken and so on in a circular arc.

FIG. 29 shows a conventionally known circular arc slide apparatus (see, for example, Japanese Unexamined Patent Application No. 2005-3080).

This circular arc slide apparatus comprises a lower plate 510, an upper plate 520 assembled on the lower plate 510, and a circular arc track 530 provided between the lower plate 510 and the upper plate 520 for guiding the upper plate 520 in a circular arc motion in a motion reference plane perpendicular to the lower plate 510.

Separately manufactured guide rails 531 and 532 are mounted on mutually-opposing mounting surfaces of the lower plate 510 and the upper plate 520 respectively, two sets of opposing surfaces parallel with the aforementioned motion reference plane and mutually opposing in the direction orthogonal to the motion reference plane are assured in the lower plate 510 side guide rail 531 and the upper plate 520 side guide rail 532, and circular arc curve-shaped guide rails 533 of a sideways V-shape cross-section which by virtue of having respectively identical centers of curvature and radii of curvature constitute the aforementioned circular arc track are formed in these opposing surfaces. In addition, a plurality of rollers (columnar bodies) 535 serving as rolling bodies are rollably fitted by means of a cross-roller system into a space of a rectangular-shaped cross-section formed between the opposing guide rails 533, the roll of the rollers 535 guiding the upper plate 520 in a circular arc motion. The symbol 550 denotes a retainer for supporting the rollers 535, and the symbol 560 denotes a stopper screw adjusted to prevent fall-out of the rollers 535 and the retainer 550.

However, there are problems inherent to the conventional circular arc slide apparatus shown in FIG. 29 in that, because the guide rails 531, 532 are separately manufactured to the lower plate 510 and the upper plate 520 before being assembled on the mounting surfaces of the lower plate 510 and the upper plate 520, error in the assembled sections prevents a sliding operation of satisfactory precision being performed, and the costs associated with the manufacture and assembly of the slide apparatus ensure the high cost thereof.

Thereupon, as shown in FIG. 30, a circular arc slide apparatus of a structure in which mutually-insertable guide rail portions 615, 625 are integrally formed and provided in a lower plate 610 and an upper plate 620 respectively, and in which circular arc curve-shaped guide grooves 633 of a sideways V-shape cross-section are formed directly on a mutually-opposing outer surface and inner surface of these guide rail portions 615, 625 and a plurality of rollers 635 supported by a retainer 650 are inserted into a space of a rectangular-shaped cross-section between the opposing guide rails 633 has been proposed with the object of resolving these problems (see, for example, Japanese Unexamined Patent Application No. 2005-3080). In this case as well, the rollers 635 are fitted by means of a cross-roller system (a system for arranging the axial center lines of adjacent rollers to intersect at right angles). The symbol 660 denotes a stopper screw.

When the guide grooves 633 are directly formed on the lower plate 610 and the upper plate 620 in this way, component part assembly error is eliminated and, accordingly, improved precision is achieved. In addition, the thus afforded reduction in the number of component parts contributes to cost reduction.

However, while the process of machining the structure shown in FIG. 29 is not that difficult due to the circular arc curve-shaped guide grooves 533 being machined in the guide rails 531, 532 which can be regarded as a single unit, because the structure shown in FIG. 30 necessitates that the guide grooves 633 of a sideways V-shape cross-section be directly formed in such a way as to describe a circular arc curve on the outer surface and the inner surface of the guide rail portions 615, 625 integrally formed in the lower plate 610 and the upper plate 620, in reality this machining is very difficult and, even if the machining were able to be performed, the exorbitant costs required to ensure high-precision machining was performed would remain a concern.

SUMMARY OF THE INVENTION

With the foregoing conditions in mind, it is an object of the present invention to provide a circular arc slide apparatus that facilitates improved precision and a reduction in costs.

A circular arc slide apparatus comprises: a lower plate; an upper plate assembled on the lower plate; and a circular arc track, provided between the aforementioned lower plate and upper plate, for guiding the upper plate in a circular arc motion within a motion reference plane perpendicular to the lower plate, mutually-insertable guide rail portions are provided in an upper surface of the aforementioned lower plate and a lower surface of the aforementioned upper plate, two sets of opposing planar surfaces parallel to the aforementioned motion reference plane and mutually opposing in a direction orthogonal to the motion reference plane are provided in the guide rail portion of the lower plate and the guide rail portion of the upper plate, circular arc curve-shaped guide grooves which, by virtue of having respectively identical centers of curvature and radii of curvature, constitute the aforementioned circular arc track are provided in the opposing planar surfaces, cross-sections of the aforementioned mutually-opposing guide grooves are respectively formed in a circular arc shape defining a portion of a same circle, a plurality of balls of diameter corresponding to the cross-sectional shape of the two guide grooves are rollably fitted between these opposing guide grooves in a preloading state and, furthermore, the aforementioned lower plate and the upper plate are integrally machined from a plate-like material and formed in a shape comprising the aforementioned guide rail portions and guide grooves, and an inner surface of each of the aforementioned guide grooves is configured from a machined surface produced by an end mill.

The depth of each of the guide grooves is set to a dimension, machinable by a tip semicircular cutting blade portion of an end mill in a state in which a tool rotation axis is set diagonally to an axis perpendicular to the aforementioned opposing planar surfaces, that is not more than 0.146 times the diameter of the aforementioned balls.

The aforementioned plurality of balls are rotatably supported, with a fixed interval maintained therebetween, by a plate-like retainer fitted in a space secured between the aforementioned mutually-opposing opposing planar surfaces and a partial surface of each of the balls is exposed to an exterior through a window portion provided in two sides of the retainer, the aforementioned balls coming into contact with an inner surface of the aforementioned guide grooves at this exposed surface.

An escape groove for avoiding contact with a surface of the aforementioned balls is provided in a groove base portion of the aforementioned guide groove of circular arc-shaped cross-section.

The aforementioned two sets of mutually-opposing opposing planar surfaces are defined by an inner surface of the aforementioned guide rail portion of one of either the aforementioned upper plate or lower plate and by an outer surface of the aforementioned guide rail portion of the other, the aforementioned guide grooves being formed in this inner surface and outer surface.

Because the guide grooves for constituting the circular arc track are integrally machined in guide rail portions provided in the upper plate and the lower plate, different to a structure in which separately manufactured guide rails are assembled in mounting surfaces formed in the upper plate and the lower plate, the number of component parts can be reduced, and the time and trouble taken for the assembly thereof and for which expertise is required can be reduced. In addition, this reduction in component part assembly ensure a reduction in assembly section error and, accordingly, and ensures improved circular arc motion guiding precision. Accordingly, a reduction in costs is achieved while achieving improved precision.

In addition, because balls are adopted as the rolling bodies fitted between the opposing guide grooves, the cross-sectional shape of the circular arc curve-shaped guide grooves can be set as a circular arc shape rather than a sideways V-shape and, accordingly, the guide groove machining can be performed using an end mill.

That is to say, different to the sideways V-shape cross-sectional grooves of a cross roller, a shallow groove depth can be produced when the cross-sectional shape of the guide grooves is a circular arc shape. For this reason, even if the interface conditions between the machine tool and the machined surface are harsh and, in reality, guide groove machining of a curved shape using a rotating tool is difficult, the guide groove can be machined into a circular arc curve-shape by a tip semicircular cutting blade portion of an end mill set to a specific position. Accordingly, a simplification of the machining using an end mill is achieved and, in turn, a reduction in costs is achieved.

Because a guide groove depth significantly less than the diameter of the balls can be set, the guide grooves can be easily and reliably cut using a tip semicircular cutting blade portion of an end mill. In other words, if the rotating axis of an end mill is inclined to an angle of, for example, 45° to an axis perpendicular to an opposing planar surface, groove machining is possible in a range from the center, that is to say the center of rotation, to the outermost circumferential portion of the tip semicircular cutting blade portion of the end mill (cuttable semicircular section excluding the center of zero rotational speed). In this case, as shown in FIG. 11, taking the radius of the end mill as r, the maximum machinable groove depth Em can be expressed as:

$Em = r - r/\sqrt{2}$. In a calculation thereof, because $Em \approx 0.293r$ and 2r is essentially equivalent to a diameter D of the balls, the actual machinable groove depth is:

$E < Em \approx 0.293r \approx 0.146D$.

The maximum machinable groove depth is achieved when the tool rotation axis is set to 45° and, accordingly, provided the guide groove depth is set to a dimension of not more than 0.146 times the diameter of the balls, machining using an end mill in which the difficulties associated with the interface relationship between the member being machined and the machine tool can be overcome is possible.

In this case, the deeper the guide groove depth the greater the thrust force to which it is subjected and the greater the contact surface area with the balls and, accordingly, the greater the slide resistance. In addition, a shallow guide groove depth results in a reduction in the thrust force to which it is subjected and a reduction in the contact surface area with the balls and, accordingly, increased surface pressure when pressure is applied to the balls. Accordingly, the guide groove depth must be set to a suitable dimension determined on the basis thereof.

Because a shallow guide groove depth is set (set to not more than 0.146 times the diameter of the balls), the gap between the opposing planar surfaces of the guide rail portions can be expanded, and a plate-like retainer can be inserted in this gap with play. In addition, because the balls are caused to roll as a result of a portion of the surface of the balls exposed through the window portions in the two sides of the retainer coming into contact with the inner surface of an opposing guide groove, the sliding operation of the upper plate can be effected smoothly in a circular arc with respect to the lower plate.

Because an escape groove is provided in a groove base portion of the guide grooves, the contact surface area of the balls on the inner surface of the guide grooves can be controlled and, as a result, contact resistance can be decreased and, in turn, a smooth sliding operation ensured. In addition, the absence of contact between the groove base portion and the balls is advantageous both in terms of ensuring the precision of the guide groove inner surface and its contribution to the simplification of the guide groove machining.

In describing a case in which the inner side of the upper plate-side guide rail portion and the outer side of the lower plate-side guide rail portion are opposing, the lower plate-side guide rail portion is pressed into the inner side of the upper plate-side guide rail portion and, accordingly, the required pressure (contact pressure of a degree that prevents rattle) can be applied to the balls in the fitted state based on a guide groove machining tolerance having been set for each guide rail portion. Accordingly, by simply controlling the machining tolerance in this way, the need to provide means for introducing an additional pressure is eliminated, and a simplification of the configuration is achieved. This same description applies to a case in which the inner side of the lower plate-side guide rail portion and the outer side of the upper plate guide rail portion are opposing.

BRIEF DESCRIPTION OF THE DRAWINGS

FIG. 10 is a diagram showing the manner of the upper plate-side guide groove machining performed in this embodiment of which FIG. 10A is a schematic front view and FIG. 10B is an expanded view of the X part of FIG. 10A;

FIG. 12 is a diagram showing the manner of the upper plate-side guide groove machining performed in this embodiment of which FIG. 12A is a perspective view schematically showing the machining conditions, FIG. 12B is a diagram serving as a comparative example showing a tool angle at which machining is difficult, and FIG. 12C is a diagram showing an example of a tool angle at which machining is simple;

FIG. 15 is an overall schematic diagram of a rolling body unit of which FIG. 15A is a side view and FIG. 15B is an upper view;

DESCRIPTION OF THE PREFERRED EMBODIMENTS

The embodiments of the present invention will be hereinafter described with reference to the attached drawings.

Figure 1:
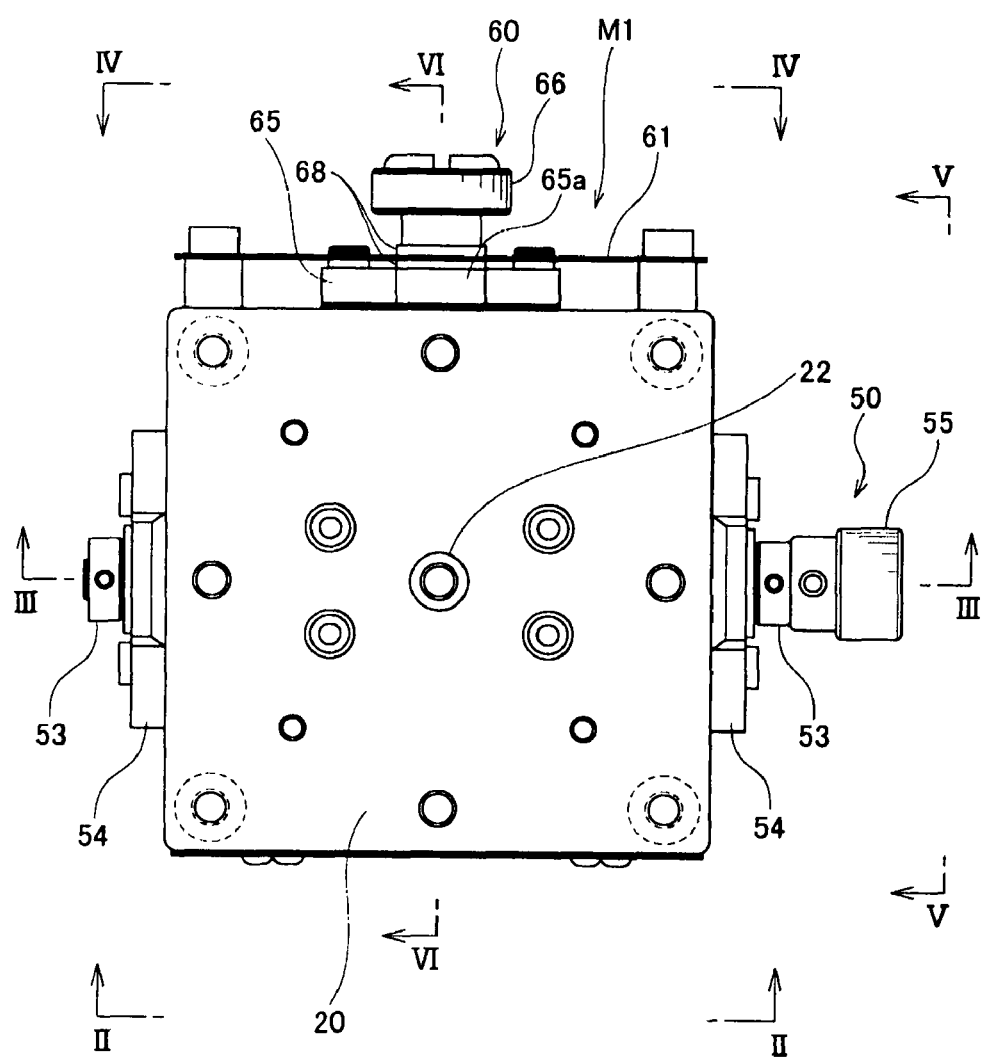
FIG. 1 is a plan view of a circular arc slide apparatus of an embodiment of the present invention.
Figure 2:
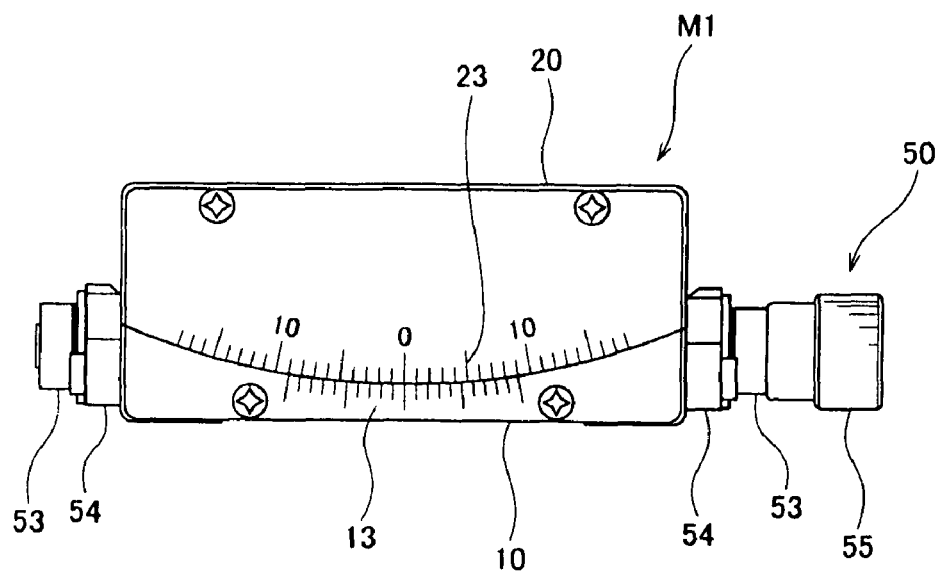
FIG. 2 is a view along the arrow II-II of FIG. 1.
Figure 3:
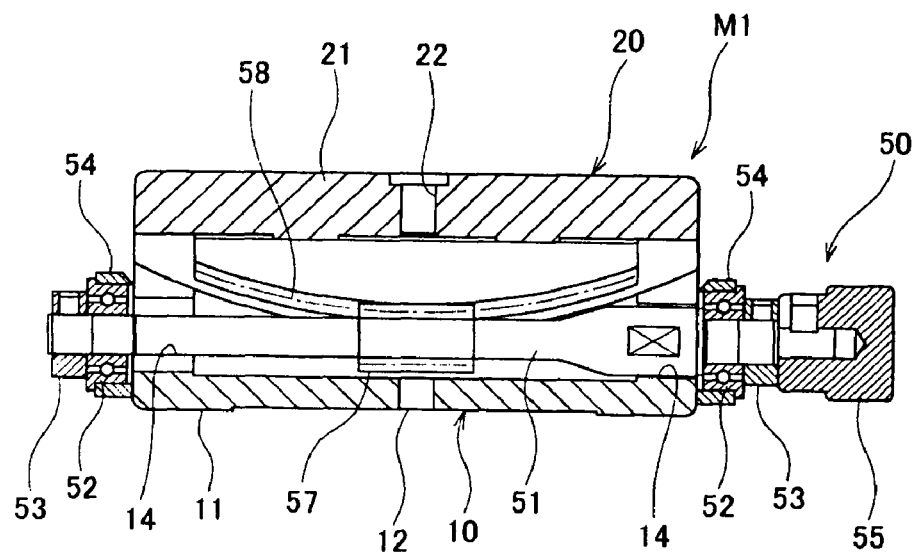
FIG. 3 is a cross-sectional view along the arrow III-III of FIG. 1.
Figure 4:
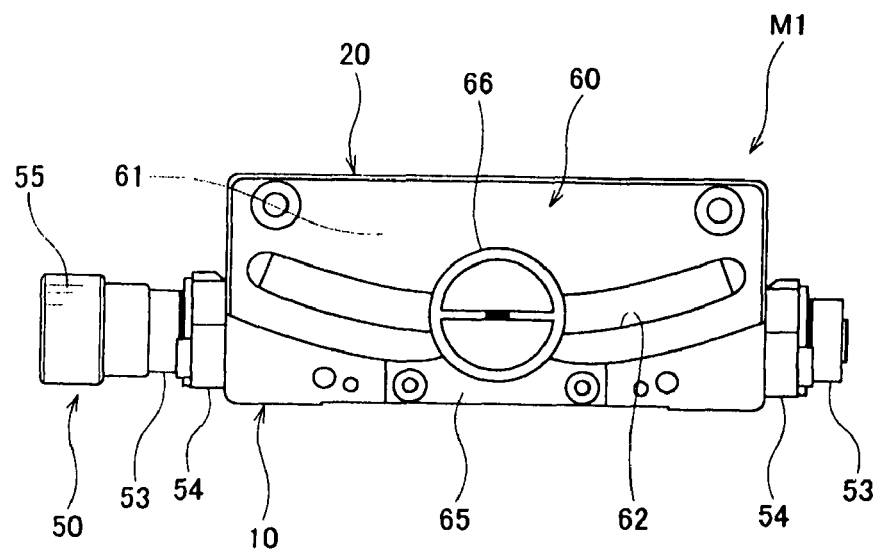
FIG. 4 is a view along the arrow IV-IV of FIG. 1.
Figure 5:
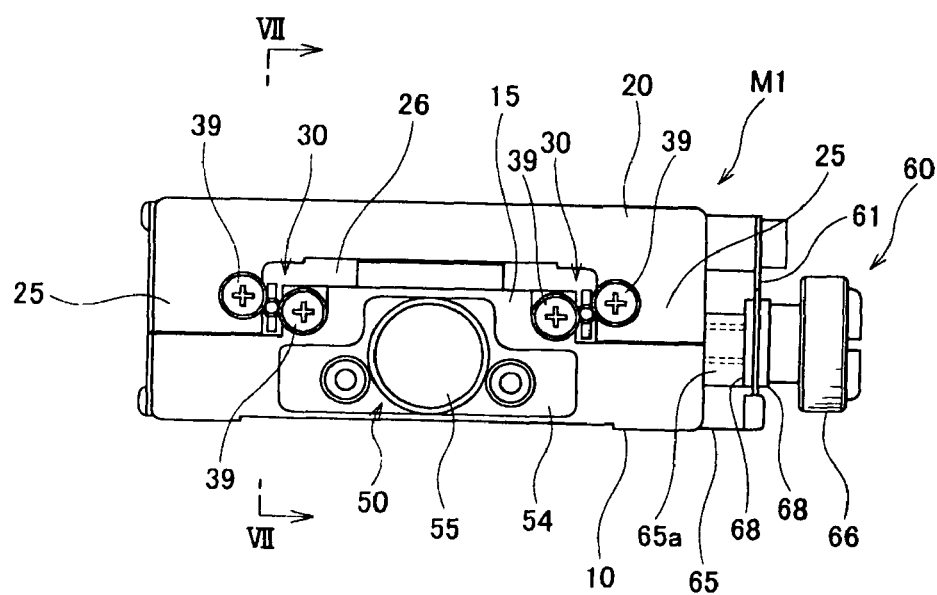
FIG. 5 is a view along the arrow V-V of FIG. 1.
Figure 6:
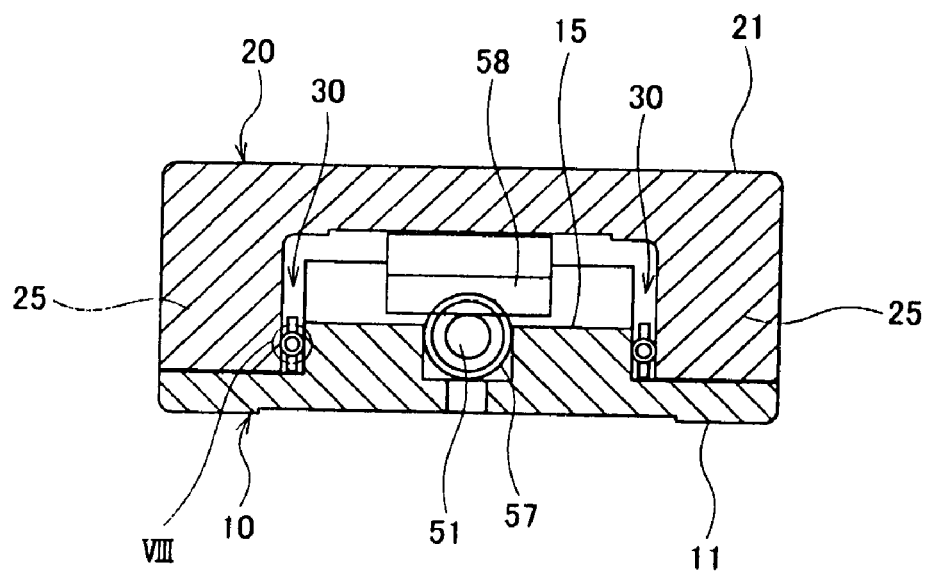
FIG. 6 is a cross-sectional view along the arrow VI-VI of FIG. 1.
Figure 7:
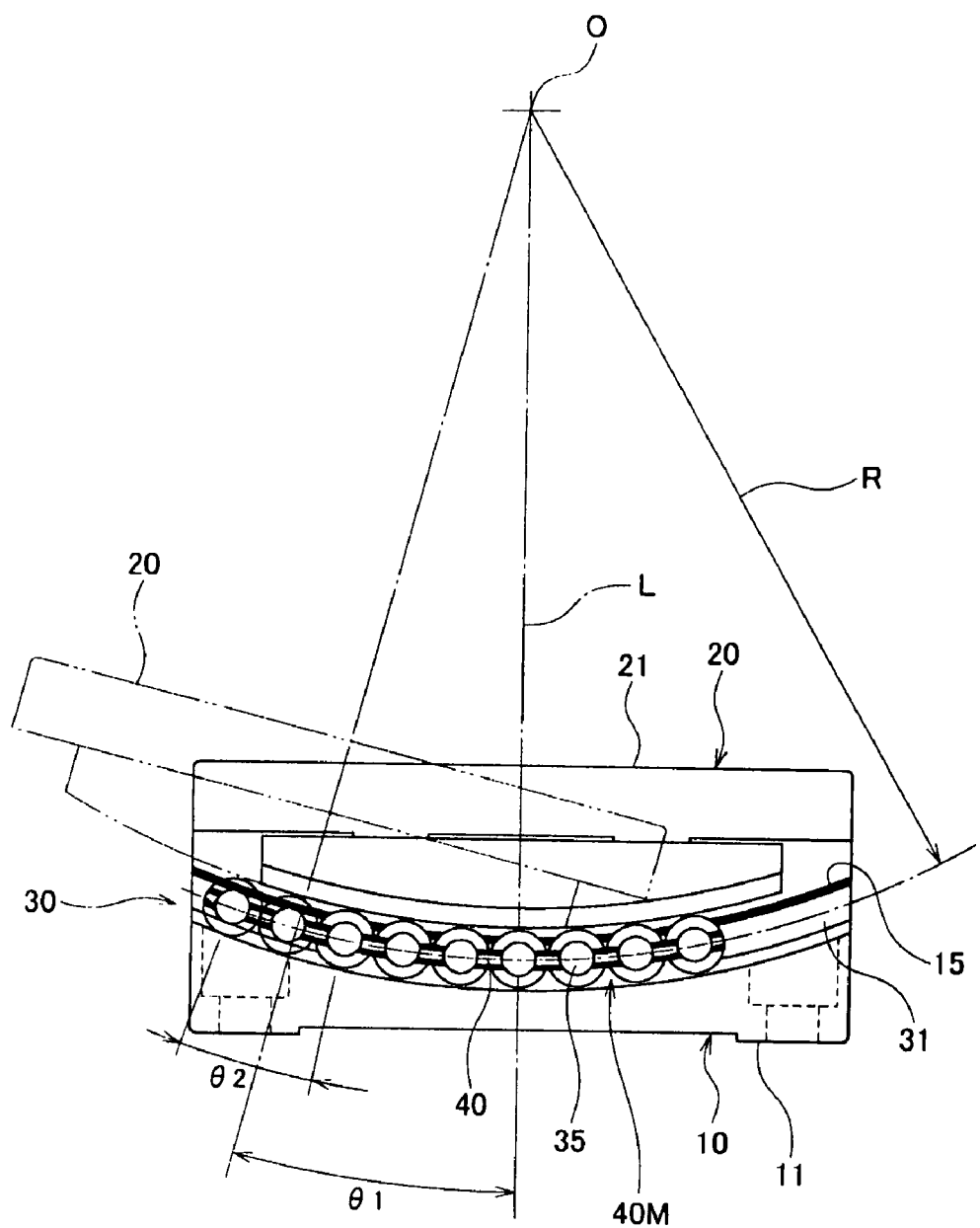
FIG. 7 is a cross-sectional view along the arrow VII-VII of FIG. 5.
Figure 8:
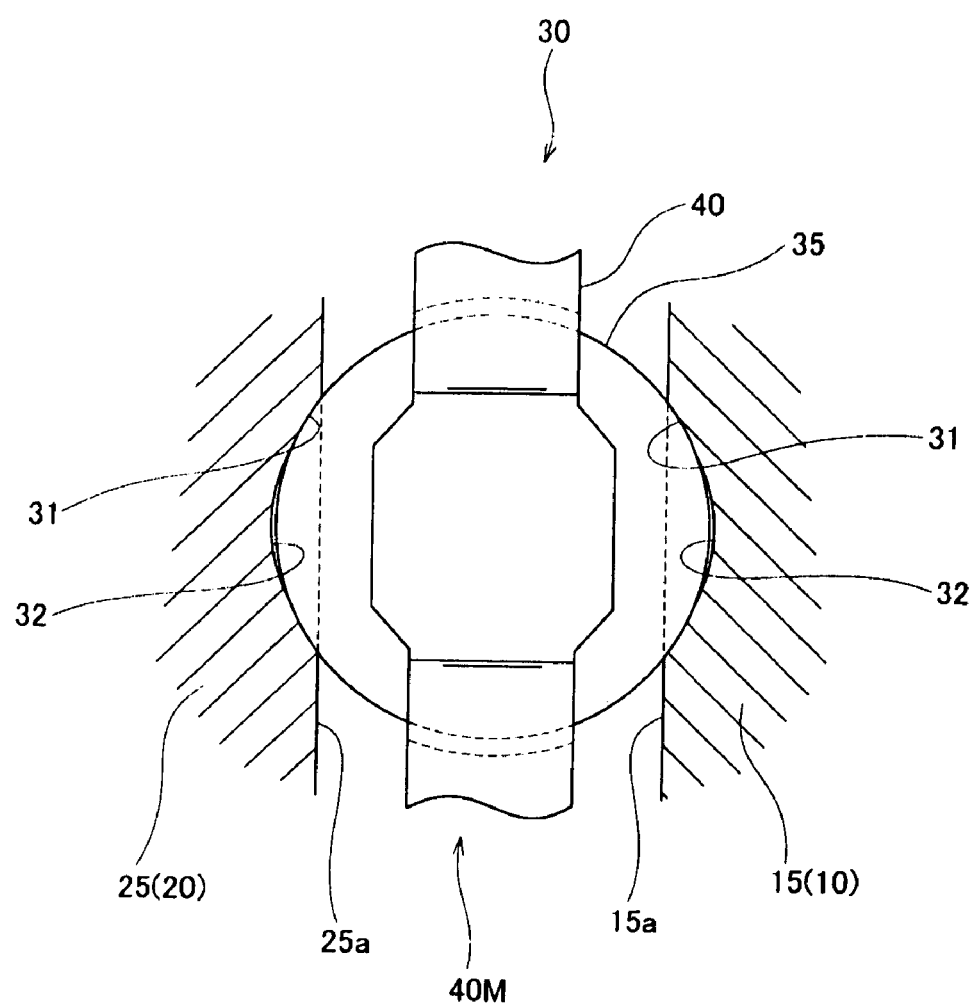
FIG. 8 is an expanded view of the VIII part of FIG. 6.
Figure 9:
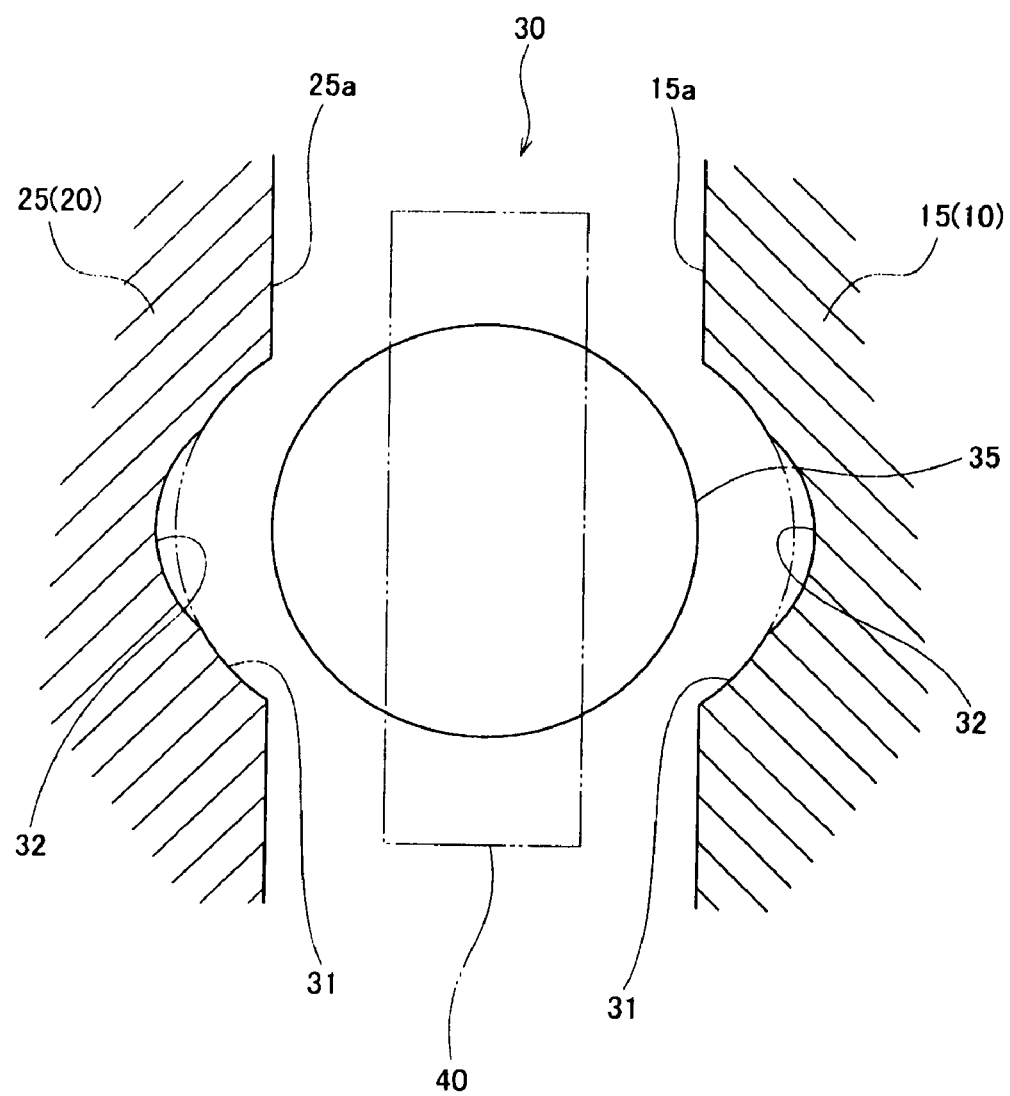
FIG. 9 is a diagram showing the individual relationships between the component parts for ease of understanding of the configuration of the section shown in FIG. 8.
Figure 10:
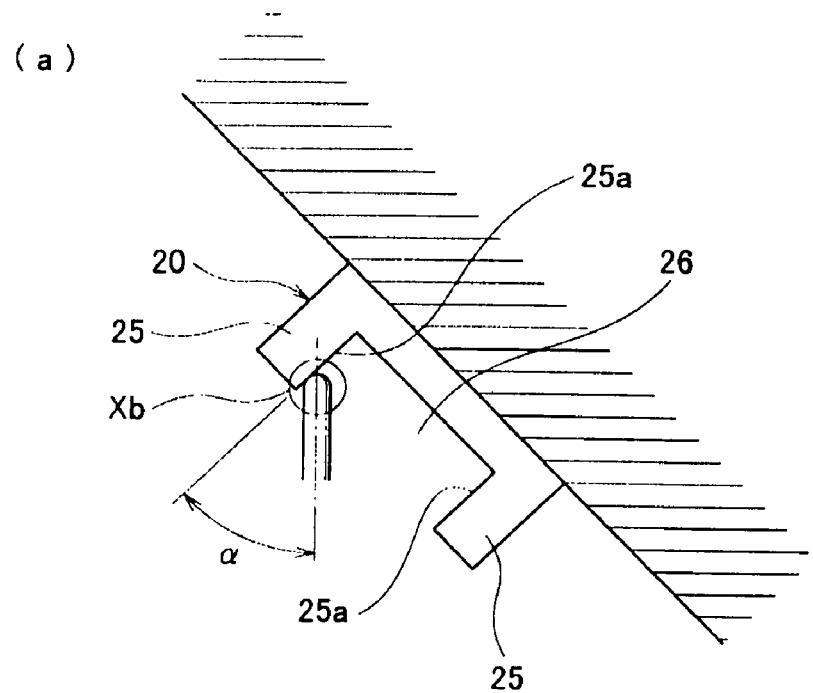
Figure 10:
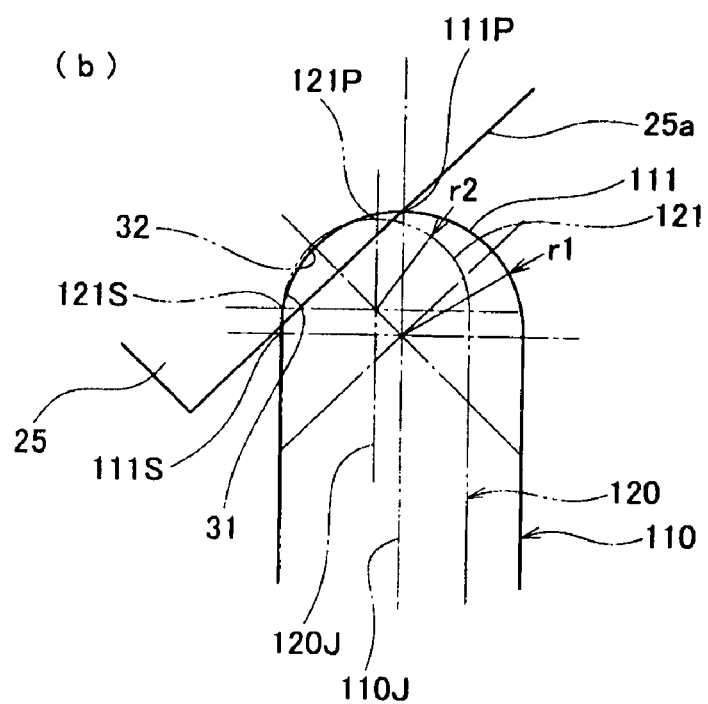

FIG. 1 is a plan view of a circular arc slide apparatus of an embodiment of the present invention; FIG. 2 is a view along the arrow II-II of FIG. 1; FIG. 3 is a cross-sectional view along the arrow III-III of FIG. 1; FIG. 4 is a view along the arrow IV-IV of FIG. 1; FIG. 5 is a view along the arrow V-V of FIG. 1; FIG. 6 is a cross-sectional view along the arrow VI-VI of FIG. 1; FIG. 7 is a cross-sectional view along the arrow VII-VII of FIG. 5; FIG. 8 is an expanded view of a VIII part of FIG. 6; and FIG. 9 is a diagram showing the individual relationships between the component parts for ease of understanding of the configuration of the section shown in FIG. 8.

A circular arc slide apparatus M1 of this embodiment comprises a lower plate 10 of a substantially square shape in the plan view, an upper plate 20 of a substantially identical shape to the lower plate 10 assembled on the lower plate 10, a circular arc track (guide track) 30 provided between the lower plate 10 and the upper plate 20, a feed mechanism 50 for sliding the upper plate 20 with respect to the lower plate 10, and a fixing mechanism 60 for fixing the upper plate 20 to the position to which it has been fed by the feed mechanism 50.

The circular arc track 30 constitutes guide means for guiding the upper plate 20 in a circular arc motion within a motion reference plane (plane parallel to the cross-section shown in FIG. 7 which, while not specifically shown in the drawing, is denoted by the symbol "V" for ease of distinguishing it from other planes) perpendicular to the lower plate 10 (strictly speaking, a later-described machining reference surface 11) of which, as shown in FIG. 5 and FIG. 6, two are provided with an interval therebetween in the width direction of the lower plate 10 and the upper plate 20.

Mutually-insertable guide rail portions 15, 25 are protrudingly provided from the lower surface of the upper plate 20 and the upper surface of the lower plate 10. The guide rail portion 15 of the lower plate 10 constitutes a section that juts outward as a broad projection from the center in the width direction of the upper surface of the lower plate 10. In addition, the guide rail portion 25 of the upper plate 20 constitutes a section that juts outward as a projection from both end sides in the width direction of the lower surface of the upper plate 20, a recess 26 into which the guide rail portion 15 of the lower plate 10 is fitted being assured between these guide rail portions 25 at both sides of the upper plate 20.

The guide rail portion 25 of the upper plate 20 and the guide rail portion 15 of the lower plate 10 exist in a mutually-insertable relationship in a state in which the single guide rail portion 15 of the lower plate 10 is sandwiched between the two guide rail portions 25 of the upper plate 20, and opposing planar surfaces 15a, 25a parallel to the above-described motion reference plane V and mutually opposing in the direction orthogonal to this motion reference plane V are provided in an inner surface of the guide rail portion 25 of the upper plate 20 and an outer surface of the guide rail portion 15 of the lower plate 10.

Two sets of opposing planar surfaces 15a, 25a are provided with an interval therebetween in the width direction of the lower plate 10 and the upper plate 20 and, as shown in FIG. 7, circular arc curve-shaped guide grooves 31 which by virtue of having respectively identical radii of curvature R and centers of curvature O constitute the aforementioned circular arc track 30 are provided in each set of opposing planar surfaces 15a, 25a. In addition, as shown in FIG. 8, a rolling body (later-described ball 35) supported by a retainer 40 is inserted between the opposing lower plate 10-side guide groove 31 and the upper plate 20-side guide groove 31.

The center of curvature O of these circular arc curve-shaped guide grooves 31 is provided in a perpendicular plane containing a center line L perpendicular to machining reference surfaces 11, 21 of the lower plate 10 and the upper plate 20, this perpendicular plane having a mutually-orthogonal relationship with the above-described motion reference plane V. Here, the machining reference surface 11 of the lower plate 10 is provided as a flat surface in the lower surface of the lower plate 10. The machining reference surface 21 of the upper plate 20 is provided as a flat surface in the upper surface of the upper plate 20. In addition, as shown in FIG. 1 and FIG. 3, circular center reference holes 12, 22 are provided in the center of the machining reference surfaces 11, 21 of the lower plate 10 and the upper plate 20. These center reference holes 12, 22 are utilized during machining and, as is described later, are utilized as a reference point during assembly with another slide apparatus.

As shown in FIG. 3, the aforementioned feed mechanism 50 is configured from an insert through-hole 14 that penetrates the guide rail portion 15 of the lower plate 10 in a direction parallel to the aforementioned motion reference plane V and the machining reference surface 11, a feed screw shaft 51 inserted in the insert through-hole 14, a bearing 52 for rotatably supporting both ends of the feed screw shaft 51, a fixing ring 53 for fixing an inner ring of the bearing 52 to the feed screw shaft 51, a bearing holder 54 for fixing an outer ring of the bearing 52 to the lower plate 10, an operation knob 55 fastened to an end portion of the feed screw shaft 51, a pinion 57 provided in a center portion in the longitudinal direction of the feed screw shaft 51 so that a portion thereof of the outer circumference is exposed through the insert through-hole 14 to the upper plate 20 side, and a rack 58 that meshes with the pinion 57 fixedly provided in the lower surface of the upper plate 20, the upper plate 20 being caused to slide with respect to the lower plate 10 by the movement of the pinion 57 and rack 58 as a result of the rotation of the feed screw shaft 51 by way of the operation knob 55.

In addition, as shown in FIG. 4 and FIG. 5, the aforementioned fixing mechanism 60 comprises a fastening plate 61 arranged in one outer side of the lower plate 10 and the upper plate 20 parallel with the plane (perpendicular reference plane V) in which the upper plate 20 is motioned in a circular arc and that is screw-fastened to the upper plate 20 in a floating state from the outer side of the upper plate 20, a circular arc-shaped groove 62 formed in the fastening plate 61, a bracket 65 fixed to the outer side of the lower plate 10 of which a fastener 65a section thereof is positioned in the rear face of the fastening plate 61, an operation knob 66 of which a screw portion thereof is screwed into the fastener 65a of the bracket 65 by way of the groove 62 of the fastening plate 61, and two clamping washers 68 arranged in the outer circumference of the screw portion of the operation knob 66 and interposed between the lower surface of the neck of the operation knob 66 and the fastener 65a to sandwich the fastening plate 61, the upper plate 20 being able to be made to slide in an untightened state of the operation knob 66, and the fastening plate 61 being pressure-clamped between the fastener 65a and the operation knob 66 in a tightened state of the operation knob 66 whereby, as a result, the slide of the upper plate 20 is able to be regulated.

As shown in FIG. 7, the slide angle range of the upper plate 20 (position essentially parallel to the lower plate 10) from the center point constitutes a range θ1 from the center point in both sides, a movement angle range θ2 of the rolling body (ball 35) and retainer 40 being equivalent to half of this angle (θ2=θ1;2). A stopper screw 39 for preventing fallout of the rolling body (ball 35) and retainer 40 is screw-fixed to the end surfaces of the lower plate 10 and the upper plate 20 located in the end portions of the guide grooves 31 after the rolling body (balls 35) and the retainer 40 have been housed.

In addition, as shown in FIG. 2, graduations 13, 23 for indicating the slide amount of the upper plate 20 are marked on the other outer side of the lower plate 10 and the upper plate 20 parallel to the plane (perpendicular reference plane V) along which the upper plate 20 is motioned in a circular arc.

As shown in FIG. 8 and FIG. 9, in the circular-arc slide apparatus of this embodiment, the cross-section of each of the mutually-opposing guide grooves 31 provided in the opposing planar surfaces 15a, 25a of the guide rail portions 15, 25 of the lower plate 10 and the upper plate 20 are formed in a circular arc shape that defines a portion of the same circle. In addition, a plurality of balls (also referred to as beads or steel balls) 35 of diameter correspondent to the cross-sectional shape of the two guide grooves 31 are rollably fitted between the opposing guide grooves 31 in a pressure-imparted (contact pressure that prevents rattle) state.

The plurality of balls 35 are rotatably supported with a fixed interval therebetween by the plate-like retainer 40 fitted in an assured space between the mutually-opposing planar surfaces 15a, 25a, and a partial surface of the balls 35 are exposed to the exterior through window portions provided in two sides of the retainer 40, the balls 35 coming into contact with the inner surface of the guide grooves 31 at this exposed surface. A rolling body unit of a configuration in which a ball 35 is assembled in a retainer 40 will be described in detail later.

In addition, an escape groove 32 for avoiding contact with the surface of the balls 35 is provided in a groove base portion of the guide grooves 31 of a circular arc-shaped cross-section. This escape groove 32 is formed as a groove with a circular arc cross-sectional shape of smaller ratio of curvature than the guide grooves 31.

Here, the lower plate 10 and the upper plate 20 are configured by from a sheet-like metal material integrally machined in a shape comprising the guide rail portions 15 and 25 and guide grooves 31, and a necessary surface treatment or the like being administered thereon following mechanical machining, the inner surface of the guide grooves 31 being configured as a machined surface using an end mill.

In this case, as shown in FIG. 10 to FIG. 13, the depth of the guide groove 31 is set to a dimension machinable by a tip semicircular cutting blade portion 111 of an end mill 110 in a state in which a tool rotation axis 110J is set diagonally to an axis T perpendicular to the opposing planar surfaces 15a, 25a that is at least not more than 0.146 times a diameter D of the balls 35 (presumed to be equal to diameter D of the end mill 110).

This point is described in detail with reference to FIG. 10 to FIG. 14.

In the circular arc slide apparatus of this embodiment, because balls 35 are used as the rolling bodies fitted between the guide grooves 31 which constitute circular arc track 30, the cross-sectional shape of the circular arc curve-shaped guide groove 31 is set to a circular arc shape rather than the sideways V-shape of the prior art. For this reason, the guide groove 31 machining can be easily implemented using an end mill.

That is to say, different to the sideways V-shape cross-sectional grooves of a cross roller, when the cross-sectional shape of the guide groove 31 is a circular arc shape a shallow groove depth can be produced. For this reason, even if the interface conditions between the machine tool and the machined surface are harsh and, in reality, guide groove 31 machining into a curved shape using a rotating tool is difficult, the guide groove 31 can be machined into a circular arc curve-shape by a tip semicircular cutting blade portion 111 of an end mill 110 set to a specific position (tool angle) as shown in FIG. 10 to FIG. 13. Accordingly, a simplification of the machining using an end mill is achieved and, in turn, a reduction in costs is achieved.

The method for machining the guide groove 31 will be specifically explained.

For example, as shown in FIG. 12B, when an attempt to machine a guide groove 31 in the inner surface (opposing planar surface 25a) of the guide rail portion 25 of the upper plate 20 subsequent to the tool rotation axis 110J of the end mill 110 being set parallel to an axis T perpendicular to the opposing planar surface 25a is made, a plate section of the upper surface of the upper plate 20 forms an obstruction JX that causes severe limitations to the machining. Thereupon, as shown in FIGS. 12A and 12C, the tool rotation axis 110J of the end mill 110 is inclined an angle β (angle α to the opposing planar surface 25a) to the axis T perpendicular to the opposing planar surface 25a. As a result, interference between the obstruction JX and the tool-side elements can be avoided, and groove machining using the tip semicircular cutting blade portion 111 of the end mill 110 is possible.

Figure 11:
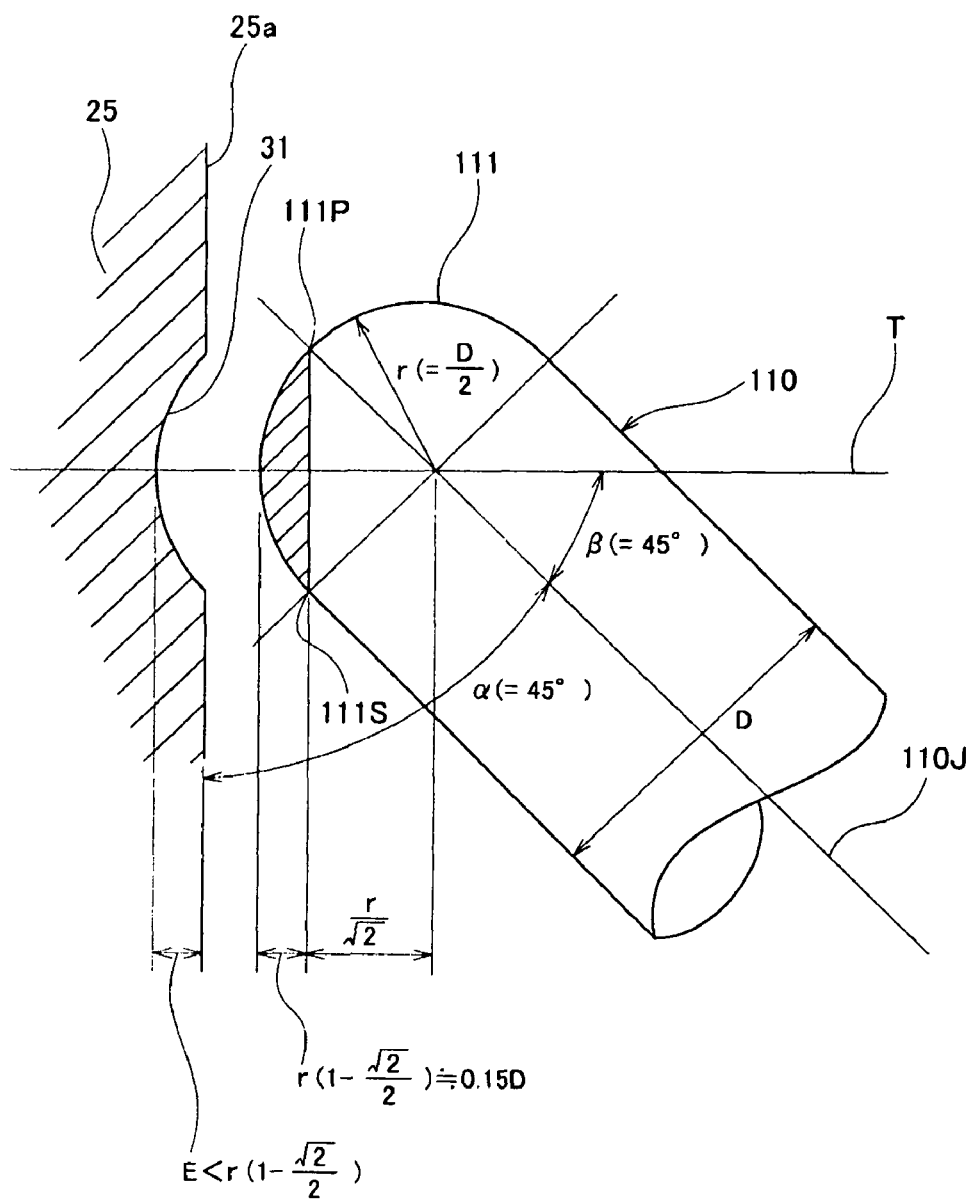
FIG. 11 is a diagram showing the relationship between the guide groove and an end mill serving as a machine tool.
Figure 12:
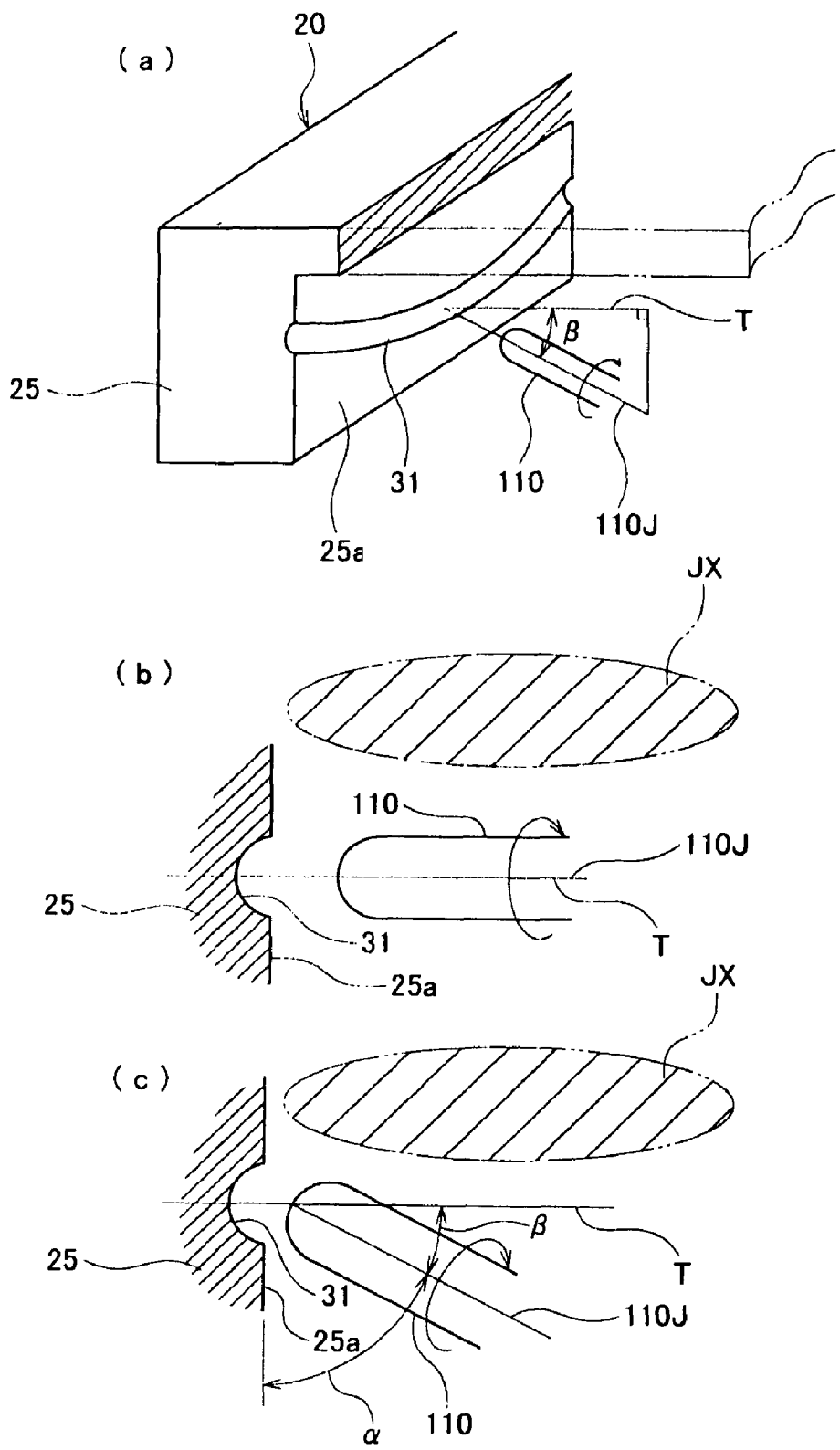

For example, as shown in FIG. 11, if the rotating axis 110J of the end mill 110 is set to incline 45° to the axis T perpendicular to the opposing planar surface 25a, groove machining is possible in a range indicated by the diagonal line in the diagram from a center 111P, that is to say, the center of rotation, to an outermost circumferential portion (maximum diameter portion) 111S of the tip semicircular cutting blade portion 111 of the end mill 110 (cuttable semicircular section excluding the center 111P of zero rotation speed). In this case, taking the radius of the end mill 110 as r, the maximum machinable groove depth Em can be expressed as:

Em=r−r/√2. In a calculation thereof, because Em≅0.293r and 2r is essentially equivalent to a diameter D of the balls, the actual machinable groove depth E is:

$$E<Em\cong 0.293r\cong 0.146D.$$

The maximum machinable groove depth is possible when the tool rotation axis is set to 45° and, accordingly, provided the guide groove 31 depth is set to a dimension at least not more than 0.146 times the diameter of the balls 35, machining using an end mill 110 is possible while overcoming the difficulties associated with the interface relationship between the member being machined and the machine tool.

Moreover, the deeper the guide groove 31 depth the greater the thrust force to which it is subjected and the greater the contact surface area with the balls 35 and, accordingly, the greater the slide resistance. In addition, a shallow guide groove 31 depth results in a reduction in the thrust force to which it is subjected and a reduction in the contact surface area with the balls 35 and, accordingly, increased surface pressure when pressure is applied to the balls 35. Accordingly, the guide groove 31 depth must be set to a suitable dimension determined on the basis thereof.

Figure 13:
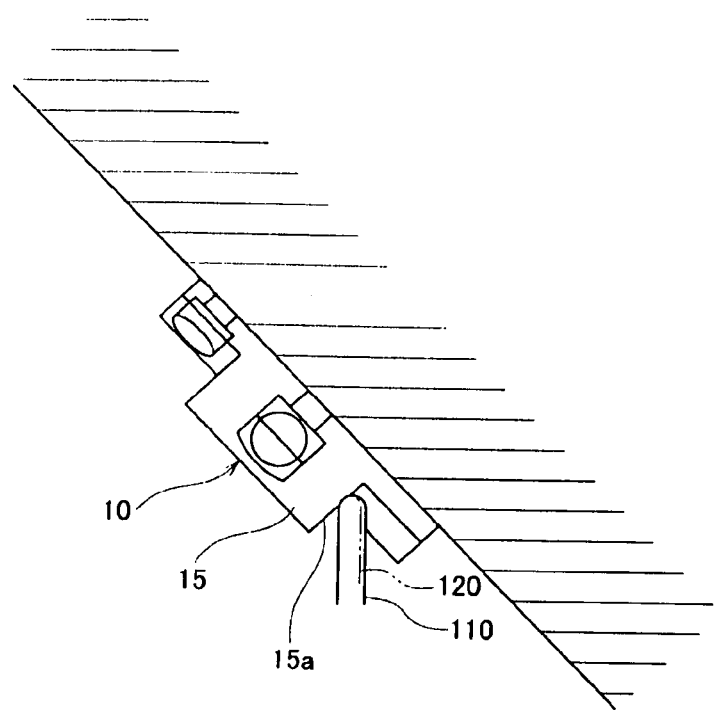
FIG. 13 is a schematic front view showing the manner in which the lower plate-side guide groove machining is performed in this embodiment.

As shown in FIGS. 10A and 10B and FIG. 13, the guide groove 31 of the upper plate 20 and the lower plate 10 can be machined by an end mill 110 comprising a tip semicircular cutting blade portion 111 of radius r1, and the escape groove 32 can be machined by an end mill 120 comprising a tip semicircular cutting blade portion 121 of radius r2.

In other words, the guide groove 31 can be machined in a range from a center 111P of the tip semicircular cutting blade portion 111 of radius r1 to an outermost circumferential portion (maximum diameter portion) 111S of the large-diameter end mill 110, and the escape groove 32 provided in the groove base portion of the guide groove 31 can be machined in a range from a center 121P of the tip semicircular cutting blade portion 121 of radius r2 to an outermost circumferential portion (maximum diameter portion) 121S of the small-diameter end mill 120. An angle a (=90°−β) of the rotating axes 110J, 120J of the end mills 110, 120 to the surface to be machined is set to, for example, 45°.

Figure 14:
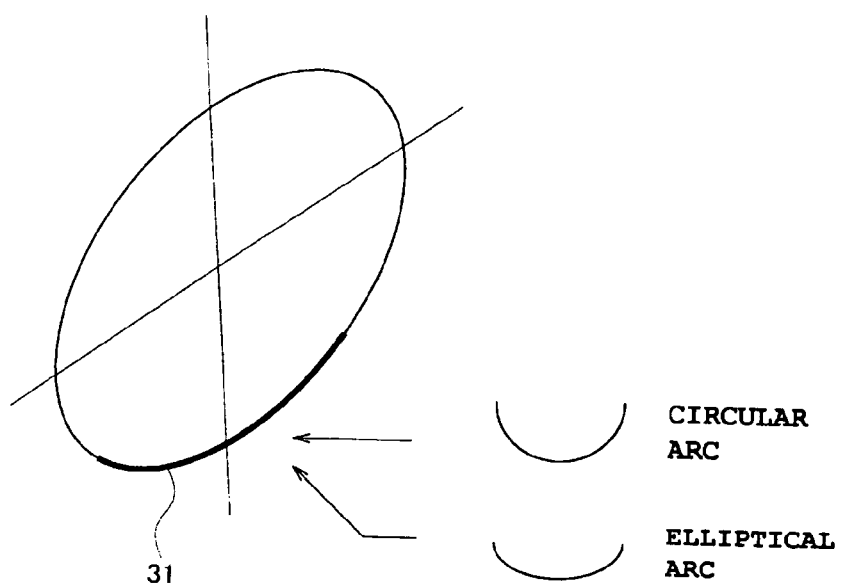
FIG. 14 is an explanatory diagram of the feed path of a tool when a circular arc curve-shaped guide groove is machined.

Because guide grooves 31 of a circular arc curve-shape are machined in opposing planar surfaces 15a, 25a of the guide rail portions 15, 25 by end mills 110, 120 set in a rotating position diagonal to the planar surfaces to be machined (opposing planar surfaces 15a, 25a), as shown in FIG. 14, it is particularly important that the end mills 110, 120 in this case be fed to the material to be machined along an elliptical arc locus.

In other words, a curve that describes an elliptical arc as viewed from the diagonal and is seen as a circular arc curve from the front is formed and, accordingly, a program for numerically controlling the position of the tip end of the end mills 110, 120 to ensure the projected shape of a circular arc curve describes an elliptical arc curve is executed. The execution of this control ensures the circular arc curve-shaped guide grooves 31 can be machined on the planar surfaces to be machined (opposing planar surfaces 15a, 25a). The rotating axes 110J, 120J of the end mills 110, 120 are arranged in a plane orthogonal to the direction in which the guide grooves 31 extend.

A rolling body unit 40M inserted in the circular arc track 30 will be hereinafter described with reference to FIG. 15 to FIG. 18.

Figure 15:
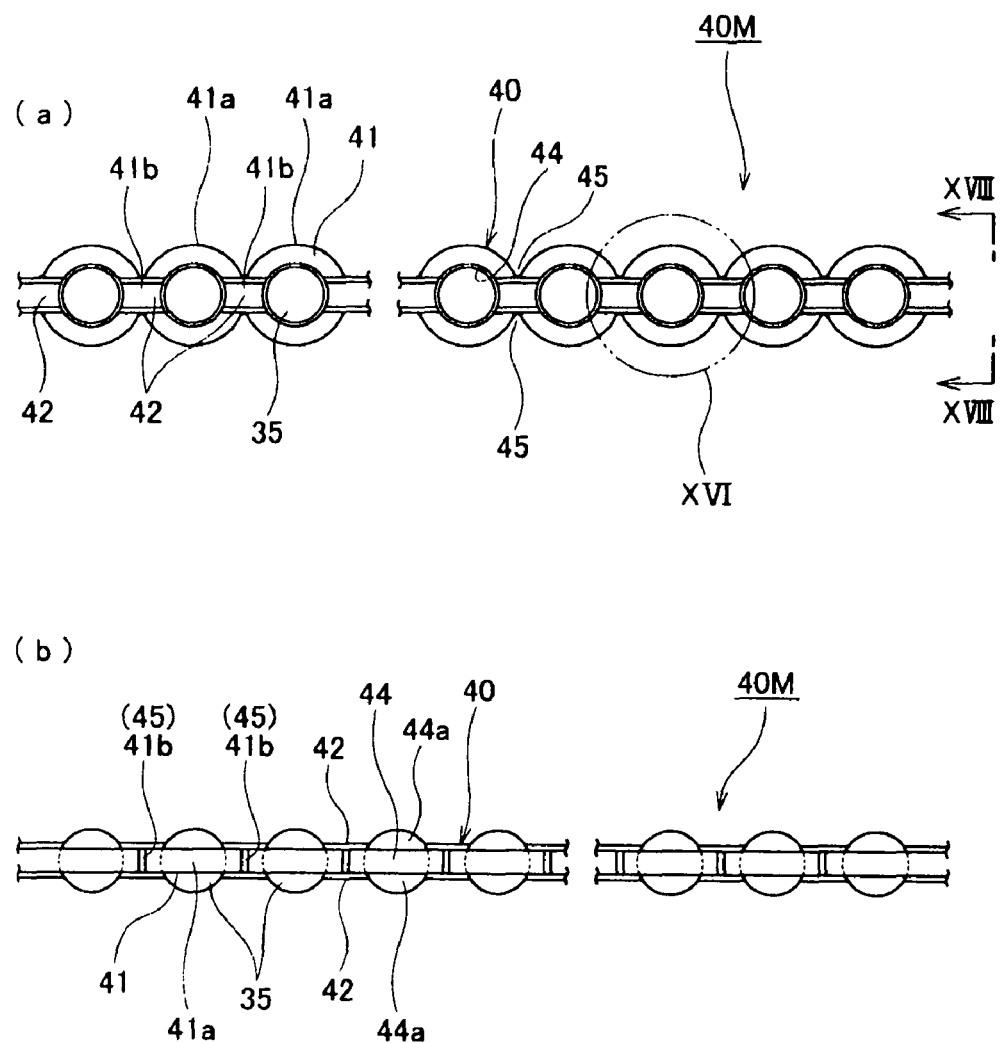
Figure 16:
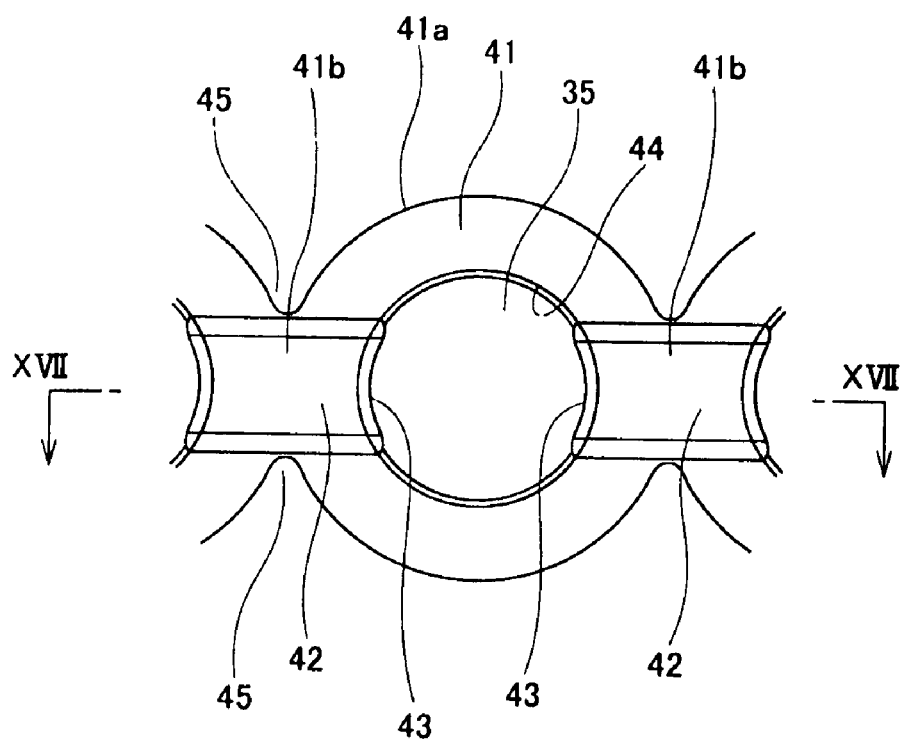
FIG. 16 is an expanded view of a cut-away portion of FIG. 15A.
Figure 17:
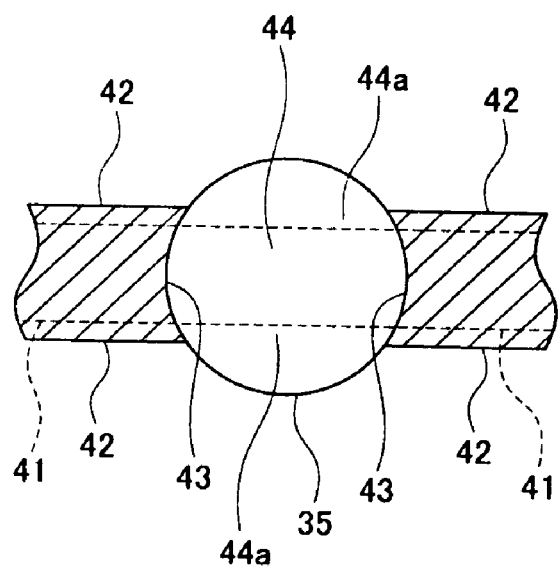
FIG. 17 is a cross-sectional view along the arrow XVII-XVII of FIG. 16.
Figure 18:
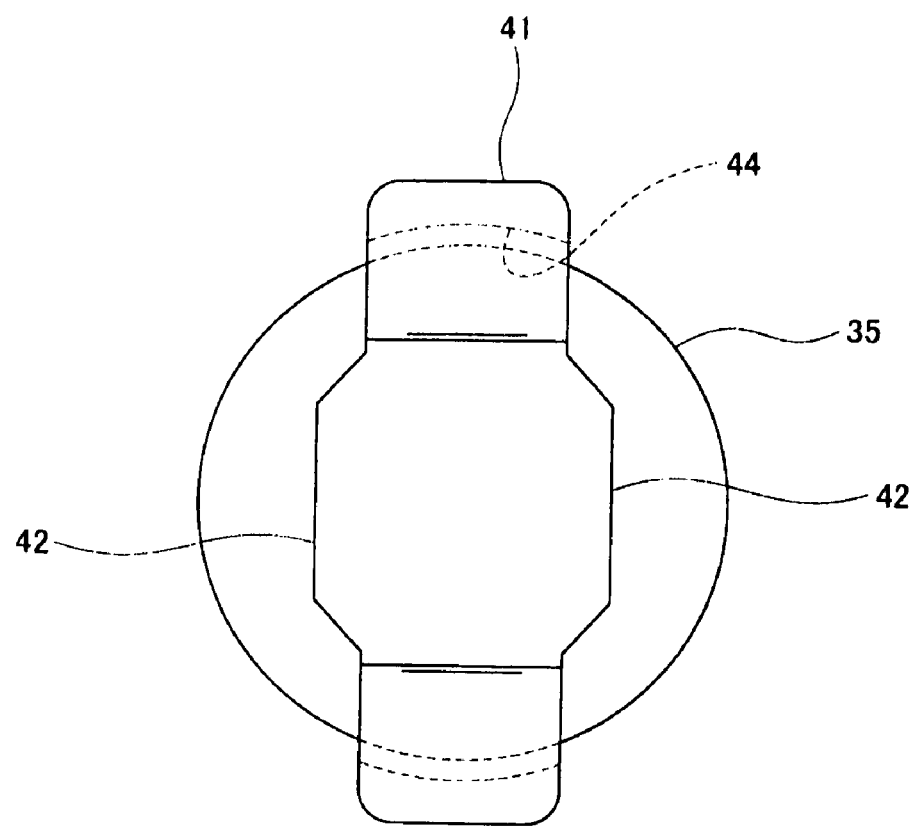
FIG. 18 is a view along the arrow XVIII-XVIII of FIG. 15.

FIG. 15 is an overall schematic diagram of a rolling body unit 40M of which FIG. 15A is a side view and FIG. 15B is an upper view, FIG. 16 is an expanded view of a cut-away portion of FIG. 15A, FIG. 17 is a cross-sectional view along the arrow XVII-XVII of FIG. 16, and FIG. 18 is a view along the arrow XVIII-XVIII of FIG. 15.

The rolling body unit 40M is configured from an annular retainer 40 made of resin, and a plurality of balls 35 fitted into the retainer 40.

The retainer 40 comprises an oblong strip plate 41 of a substantially rectangular-shaped cross-section, a plurality of ball housing portions 44 equidistantly provided in the length direction of the strip plate 41, and recesses 45 that by virtue of being located between the adjacent ball housing portions 44 to form an edge portion in the vertical direction of the strip plate 41 increase the flexural characteristics of the strip plate 41 in the vertical direction, the balls 35 being rotatably housed in the ball housing portions 44 in a state in which a portion of the surface thereof is exposed through window portions 44a that open at the both sides of the ball housing portions 44.

The side-view shape of strip plate 41 as seen from the thickness direction thereof describes a shape in which circular rings 41a comprising ball housing portions 44 and circular window portions 44a provided in the center thereof are coupled in a chain shape, the recesses 45 for increasing the flexural characteristics in the vertical direction being provided in coupling portions 41b of adjacent circular rings 41a. In other words, the aforementioned recesses 45 constitute cavities that serve as intersecting portions of the outer circumference of the circular rings 41a.

In addition, ribs 42 for localizedly increasing the thickness of the strip plate 41 are provided in both sides of the coupling portion 41b of adjacent circular rings 41a, end surfaces of the ribs 42 which reach the perimeter edge of the window portions 44a forming a portion of a ball-holding spherical surface 43 of the inner circumference of the ball housing portions 44, and the housed balls 35 grabbing against the end-edge portions of the ribs 42 and being prevented from falling out as a result.

Figure 19:
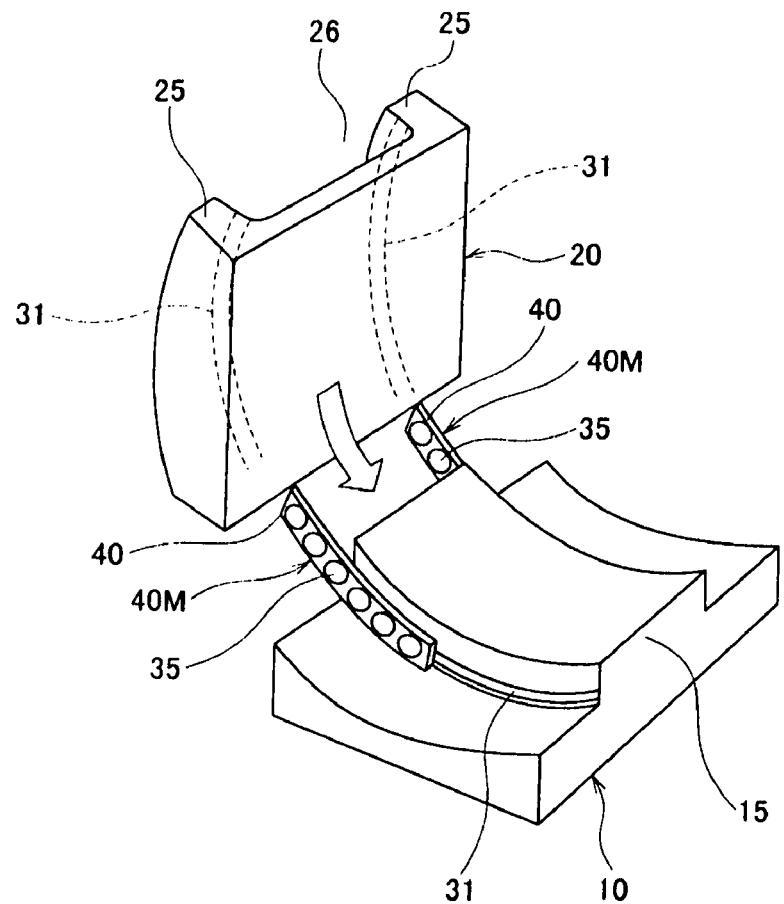
FIG. 19 is a perspective view for explaining the process involved in the method of assembly performed when the rolling body unit is assembled between the lower plate and the upper plate.

The method of assembly employed for assembling the rolling body unit 40M between the lower plate 10 and the upper plate 20 will be hereinafter described with reference to FIG. 19 to FIG. 21. FIG. 19 is a schematic side view for explaining the assembly process, FIG. 20 is a schematic side view for explaining the assembly process, and FIG. 21 is a schematic plan view for explaining the assembly sequence.

At the machining stage, the guide groove 31 of the guide rail portion 15 of the lower plate 10 and the guide groove 31 of the guide rail portion 25 of the upper plate 20 are formed with a dimensional tolerance that ensures a predetermined pressure (contact pressure that prevents rattle) can be automatically generated when balls 35 are fitted within the guide grooves 31.

Figure 20:
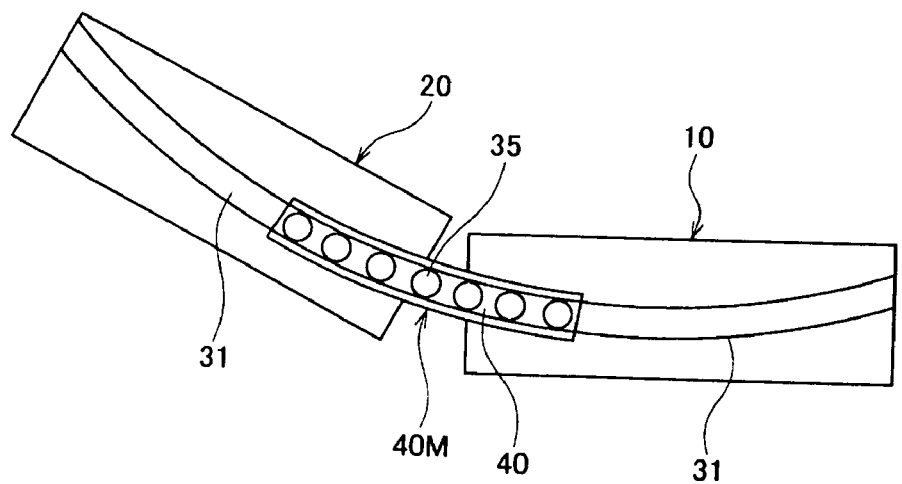
FIG. 20 is a schematic side view for explaining the assembly process.
Figure 21:
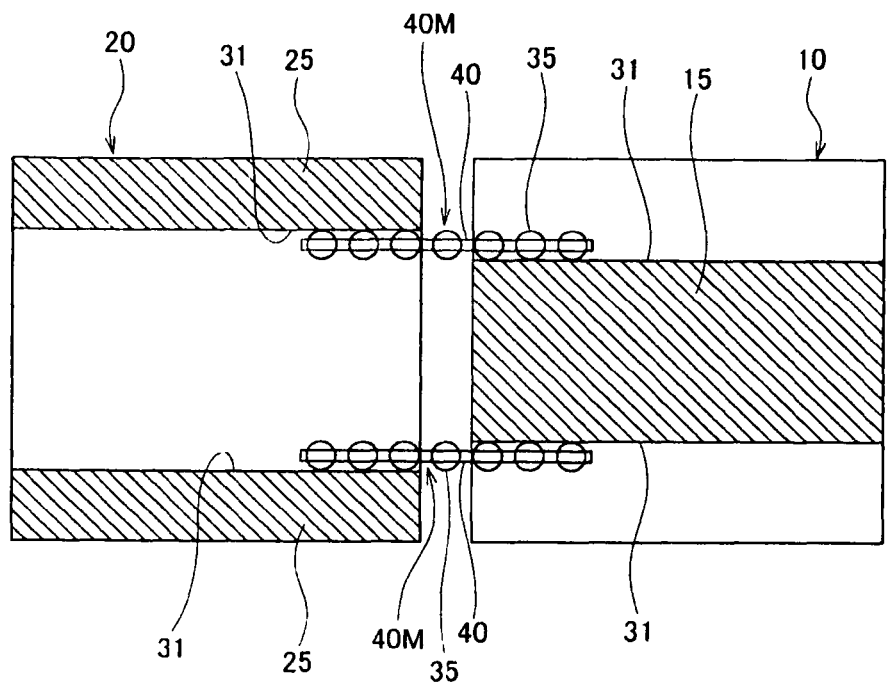
FIG. 21 is a schematic plan view for explaining the assembly process.

Thereupon, first, as shown in FIG. 19 to FIG. 21, the three component elements of the lower plate 10, the upper plate 20 and the rolling body unit 40M are supported so that substantially half the number of balls 35 supported in the retainer 40 are suspended in a first guide groove 31, and the remaining substantially half the number of balls 35 are suspended in the second guide groove 31, the balls 35 supported by the retainer 40 being inserted between the two guide grooves 31 from this state as the second guide groove 31 is caused to slide to the first guide groove 31.

That is to say, first of all, for example as shown in FIG. 19, in a state in which substantially half the region in the length direction of the rolling body unit 40M has been set in the guide groove 31 of the lower plate 10, the remaining substantially half the region thereof is set in the guide groove 31 of the upper plate 20. In addition, in this state, the upper plate 20 and the lower plate 10 are slid together and inserted into each other. This action ensures that the rolling body unit 40M can be set smoothly between the guide groove 31 of the lower plate 10 and the upper plate 20. Moreover, because a guide groove 31 tolerance has been set, the balls 35 can be fitted within the guide grooves 31 while a pressure is being applied thereto whereupon, accordingly, while employing a simple method of assembly, high precision can be achieved. In addition, the need for a pressure-applying mechanism such as a screw for applying pressure subsequent to the balls having been assembled is eliminated and, accordingly, the structure is able to be simplified.

The action of a circular arc slide apparatus M1 of the configuration described above will be hereinafter described.

The usage of this apparatus involves, in a state in which the lower plate 10 is fixed, an operation knob 55 of a feed mechanism 50 being pulled with the fingers to rotate a feed screw shaft 51. Subsequent thereto, the upper plate 20 is caused to slide in a circular arc by an amount correspondent to the rotation amount of the feed screw shaft 51. If the rotational direction of the feed screw shaft 51 is reversed the slide direction can also be reversed. In addition, the upper plate 20 can be fixed to the position at which a predetermined slide amount is ensured by tightening an operation knob 66 of a fixing mechanism 60.

In this circular arc slide apparatus M1, the guide grooves 31 which constitute the circular arc track 30 are integrally machined in the guide rail portions 15, 25 provided in the upper plate 20 and the lower plate 10 and, different to a structure in which separately manufactured guide rails are assembled in mounting surfaces formed in the upper plate and the lower plate as in the conventional example shown in FIG. 15, the number of component parts can be reduced, and the time and trouble taken for the assembly thereof and for which expertise is required can be reduced. In addition, the reduction in component part assembly ensures a reduction in assembly section error and, accordingly, ensures improved circular arc motion guiding precision. Accordingly, a reduction in costs is achieved while still achieving high precision.

In addition, because balls are adopted as the rolling bodies that are fitted between the opposing guide grooves, the cross-sectional shape of the circular arc curve-shaped guide grooves can be set as a circular arc shape rather than a sideways V-shape whereupon, accordingly, the guide groove machining can be performed using an end mill, a simplification of the machining can be achieved and, in turn, a reduction in costs achieved.

In addition, because a shallow guide groove 31 depth is set (set to not more than 0.146 times the diameter of the balls), the gap between the opposing planar surfaces 15a, 25a of the guide rail portions 15, 25 can be expanded, and the plate-like retainer 40 can be inserted in this gap with play.

In addition, because an escape groove 32 is provided in a groove base portion of the guide grooves 31, the contact surface area of the balls 35 on the inner surface of the guide grooves 31 can be controlled and, as a result, contact resistance can be decreased and, in turn, a smooth sliding operation ensured. In addition, the absence of contact between the groove base portion and the balls 35 is advantageous in terms of ensuring the precision of the guide groove 31 inner surface and contributes to the simplification of the guide groove 31 machining.

In addition, the lower plate 10-side guide rail portion 15 is pressed into the inner side of the upper plate 20-side guide rail portion 25 and, accordingly, the required pressure (contact pressure of a degree that prevents rattle) can be applied to the balls 35 with the balls 35 in the fitted state based on a guide groove 31 machining tolerance having been set for the guide rail portions 15, 25. Accordingly, by simply controlling the machining tolerance, the need to provide means for introducing an additional pressure is eliminated, and a simplification of the configuration is achieved.

In addition, according to the above-described rolling body unit 40M, because recesses 45 located between the ball housing portions 44 are provided in both side edge portions in the vertical direction of the retainer 40, the retainer 40 can be more easily bent vertically. Accordingly, this capacity to be easily bent vertically ensures use independent of the curvature of the guide groove 31 and broadens the general-purpose properties thereof. Accordingly, the trouble associated with component part management including the preparation of a retainer 40 for each guide groove 31 curvature can be reduced. In addition, the recesses 45 provided between the ball housing portions ensure that the retainer 40 can be bent vertically at the position of the recesses 45 without concern regarding the effect of this bending extending to the ball housing portions 44, and without fear that the rolling characteristics of the balls 35 will be adversely affected.

In addition, in the rolling body unit M40 outlined above, because the strip plate 41 of the retainer 40 is configured to describe a shape in which circular rings 41a are coupled in a chain shape and recesses 45 are assured in the coupling portions 41b of the circular rings 41a, the retainer 40 can be very flexibly bent while eliminating the effect of this bending on the ball housing portions 44.

In addition, because ribs 42 are provided in the coupling portions 41b and the thickness of this section of the retainer 40 can be increased as a result, and the end surfaces of the ribs 42 constitute a portion of the ball-holding spherical surface 43 of the inner circumference of the ball housing portions 44, the end-edge portions of the rib 42 can function as a gripping portion of the balls 35, and the balls 35 can be reliably supported to ensure prevention of the fallout thereof. Accordingly, the assembly thereof in a slide apparatus can be readily implemented. In addition, the provision of the ribs 42 in the coupling portions 41b alone ensures there is no loss of flexural characteristics at the position of the recesses 45, and is advantageous from the viewpoint of decreasing the plate thickness of the strip plate 41 as a whole. In other words, both in terms of increasing the flexural characteristics and decreasing the contact resistance with the balls 35, the thinner the strip plate 41 itself the better and, accordingly, a reduction in the overall thickness of the strip plate 41 affords an improved performance of the retainer 40.

Moreover, while in the configuration adopted in the embodiment outlined above a single guide rail portion 15 of the lower plate 10 side is fitted between the two guide rail portions 25 of the upper plate 20 side, an inverse configuration thereof may be adopted. In other words, two guide rail portions may be provided in the lower plate 10 side and a single guide rail portion provided in the upper plate 20 side, the single rail portion in the upper plate 20 side being sandwiched by the two guide rail portions in the lower plate 10 side.

A stage device comprising a multi-stage assembly of the circular arc slide apparatus M1 of the embodiment outlined above and other slide apparatuses M2, M3 will be hereinafter described with reference to FIG. 22 to FIG. 28.

Figure 22:
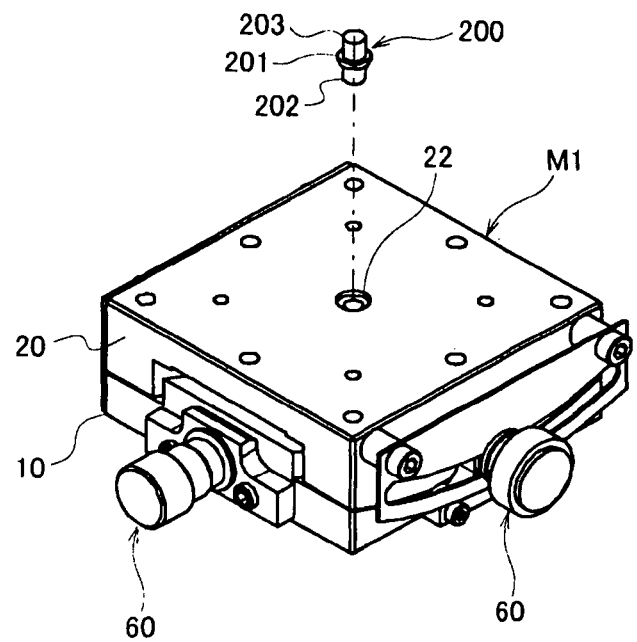
FIG. 22 is an exterior perspective view of a stand-alone circular arc slide apparatus constituted by a biaxial stage device.
Figure 23:
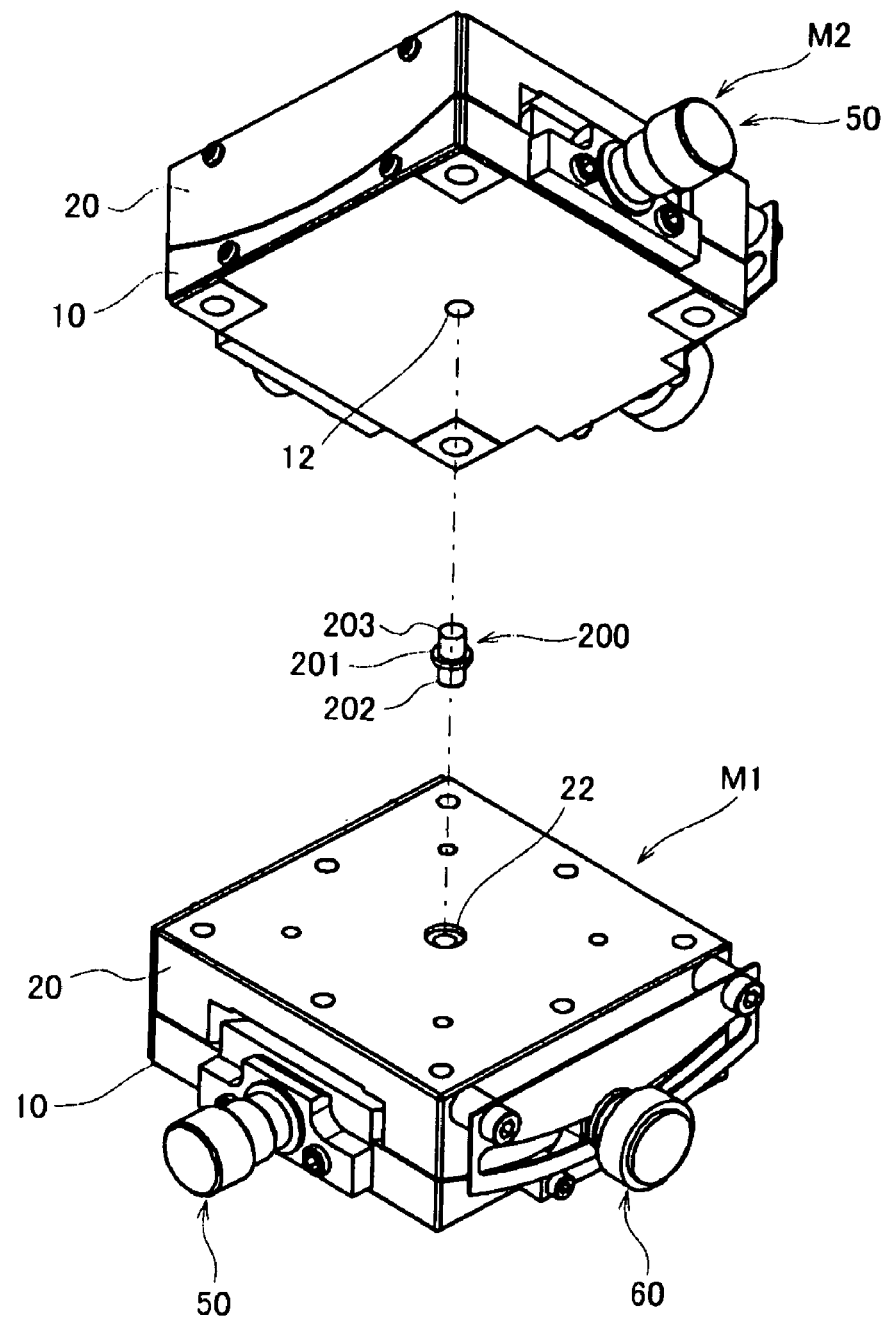
FIG. 23 is a perspective view in a state prior to assembly of a biaxial circular arc stage device configured from circular arc slide apparatuses of the same type overlapped in two stages.
Figure 24:
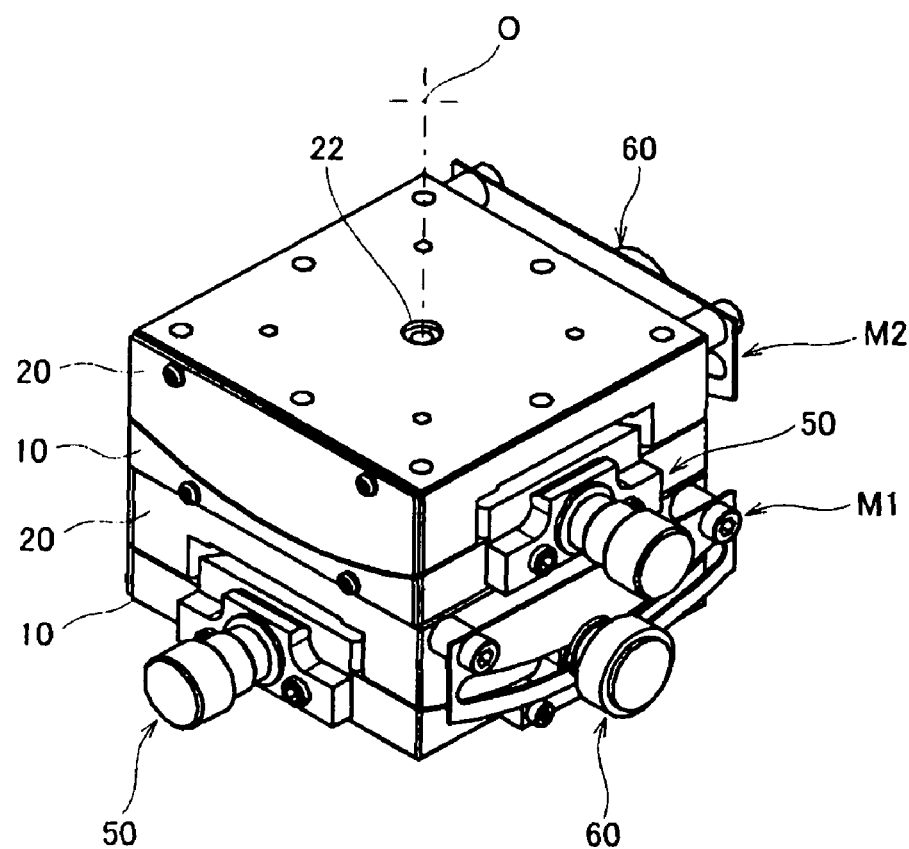
FIG. 24 is an exterior perspective view following assembly of the biaxial circular arc stage device.
Figure 25:
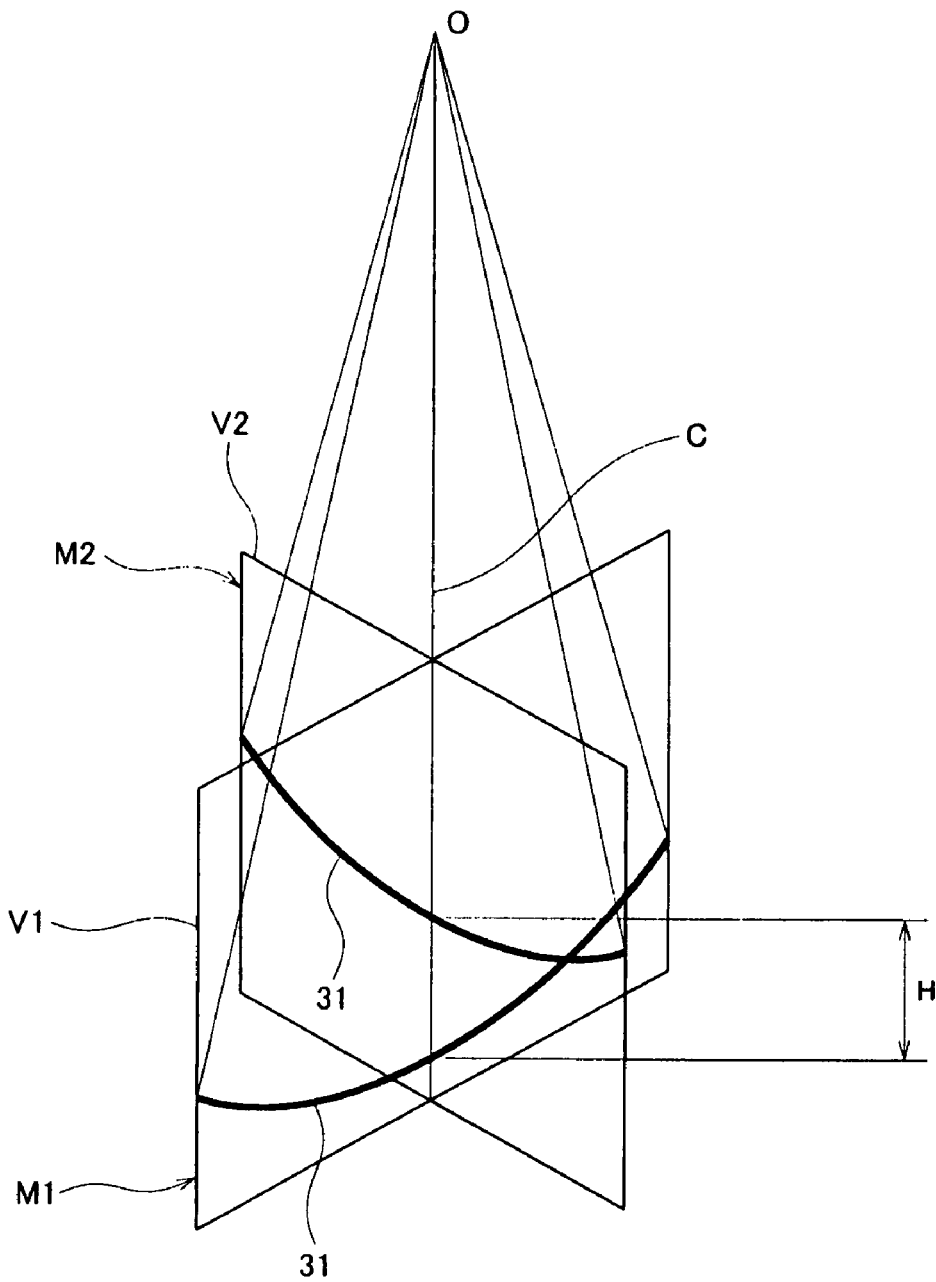
FIG. 25 is a perspective view for explaining the directionality in the circular arc motion planes of each stage of the circular arc slide apparatus.
Figure 26:
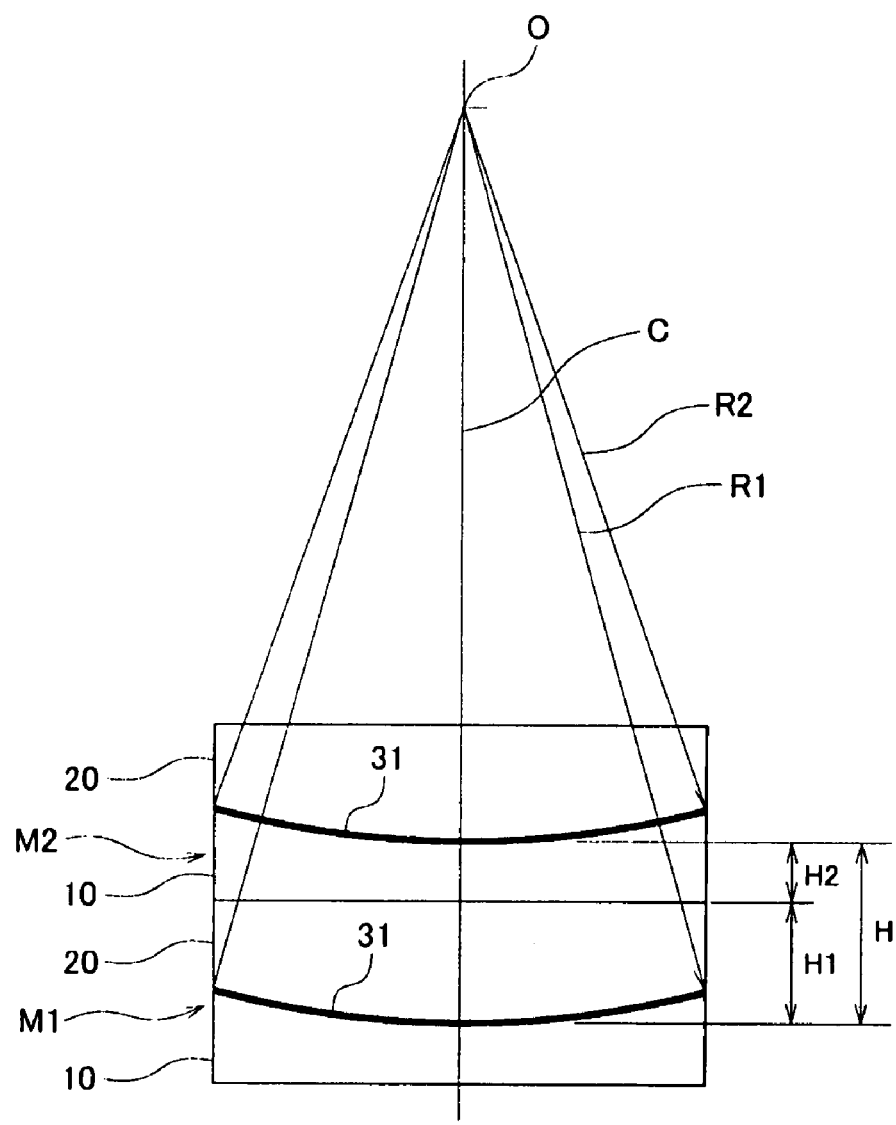
FIG. 26 is a diagram for explaining the relationship between the radii of curvature and centers of curvature of the guide grooves of each stage of the circular arc slide apparatus.

FIG. 22 is an exterior perspective view of the above-described circular arc slide apparatus M1, FIG. 23 is a perspective view in a state prior to assembly of a biaxial (α axis and β axis) circular arc stage device in which circular arc slide apparatuses M1, M2 of the same type are overlapped in two stages, FIG. 24 is an exterior perspective view following assembly of the biaxial circular arc stage device, FIG. 25 is a perspective view for explaining the directionality in the circular arc motion planes V1, V2 of each stage of the circular arc slide apparatuses M1, M2, and FIG. 26 is a diagram for explaining the relationship between the radii of curvature and centers of curvature of the guide grooves of each stage of the circular arc slide apparatuses M1, M2.

In this biaxial stage device, as shown in FIG. 25, the second circular arc slide apparatus M2 for motioning the upper plate 20 in the second circular arc motion plane V2 in a circular arc with respect to the lower plate 10 is overlapped on the first circular arc slide apparatus M1 for motioning the upper plate 20 in a circular arc in the first circular arc motion plane V1 with respect to the lower plate 10 in a mutually orthogonal relationship.

As shown in FIG. 22 and FIG. 23, this overlapping involves centering based on a lower half portion 202 of a pin 200 being fitted into a center reference hole 22 of the upper plate 20 of the lower stage first circular arc slide apparatus m1, and a center reference hole 12 of the lower plate 10 of the upper stage second circular arc slide apparatus M2 being inserted over the upper half portion 203 of the pin 200. A flange 201 serving the role of a stopper is provided in the center portion of the pin 200, the insert height of the pin 200 being determined as a result of the flange 201 fitting into a countersunk portion of the center reference hole 22 of the upper plate 20.

In addition, while this centering is being performed, the slide motion directions of the lower stage first circular arc slide apparatus M1 and the upper stage second circular arc slide apparatus M2 are set in a mutually orthogonal relationship with the two apparatuses being positioned in the horizontal rotating direction. As a result, a stage device in which α-axis circular arc slide is facilitated by a lower stage and β-axis circular arc slide is facilitated by an upper stage is formed.

As shown in FIG. 26, this assembly involves the radii of curvatures R1, R2 and centers of curvature O of the guide grooves 31 being established in advance. That is to say, first, the centers of curvature O are set to positions in the same plane (same height) perpendicular to a center line C of the two circular arc slide apparatus M1, M2.

While FIG. 25 assumes a case in which, for ease of understanding the principles thereof, individual guide grooves 31 are shown as passing through the center line C, in reality there are two guide grooves 31 (circular arc track 30) whose centers of curvature O are mutually separated that do not pass though the center line C and which, accordingly, are set to positions in the same plane perpendicular to the center line C. FIG. 26, which provides a clear illustration thereof, shows the upper side circular arc slide apparatus M2 rotated 90° to the lower side circular arc slide apparatus M1 with the motion planes of the two circular arc slide apparatus M1, M2 being made coincident.

The height of the center of curvatures O being made coincident in this way creates a difference between the upper and lower stage guide grooves 31 in the radii of curvatures R1, R2 of the guide grooves 31 of the lower stage and upper stage circular arc slide apparatuses M1, M2 equivalent to a distance H. The distance H between the upper and lower stage guide groove 31 is a value obtained by adding a distance H1 from the upper surface (coupling face with the upper stage) of the upper plate 20 of the lower stage circular arc slide apparatus M1 to its guide groove 31 to a distance H2 from the lower surface of the lower plate 10 of the upper stage circular arc slide apparatus M2 (coupling face with the lower stage) to its own guide groove 31.

As a result of the guide grooves 31 of the upper and lower stage circular arc slide apparatus M1, M2 being machined with radii of curvatures R1, R2, α-axis circular arc slide and β-axis circular arc slide orthogonal thereto can be produced about a single point (point O of FIG. 26) on the center line C of the upper and lower stage circular arc slide apparatuses M1, M2.

A triaxial stage device comprising an additional θ-axis (rotating axis in the horizontal direction) will be hereinafter described.

Figure 27:
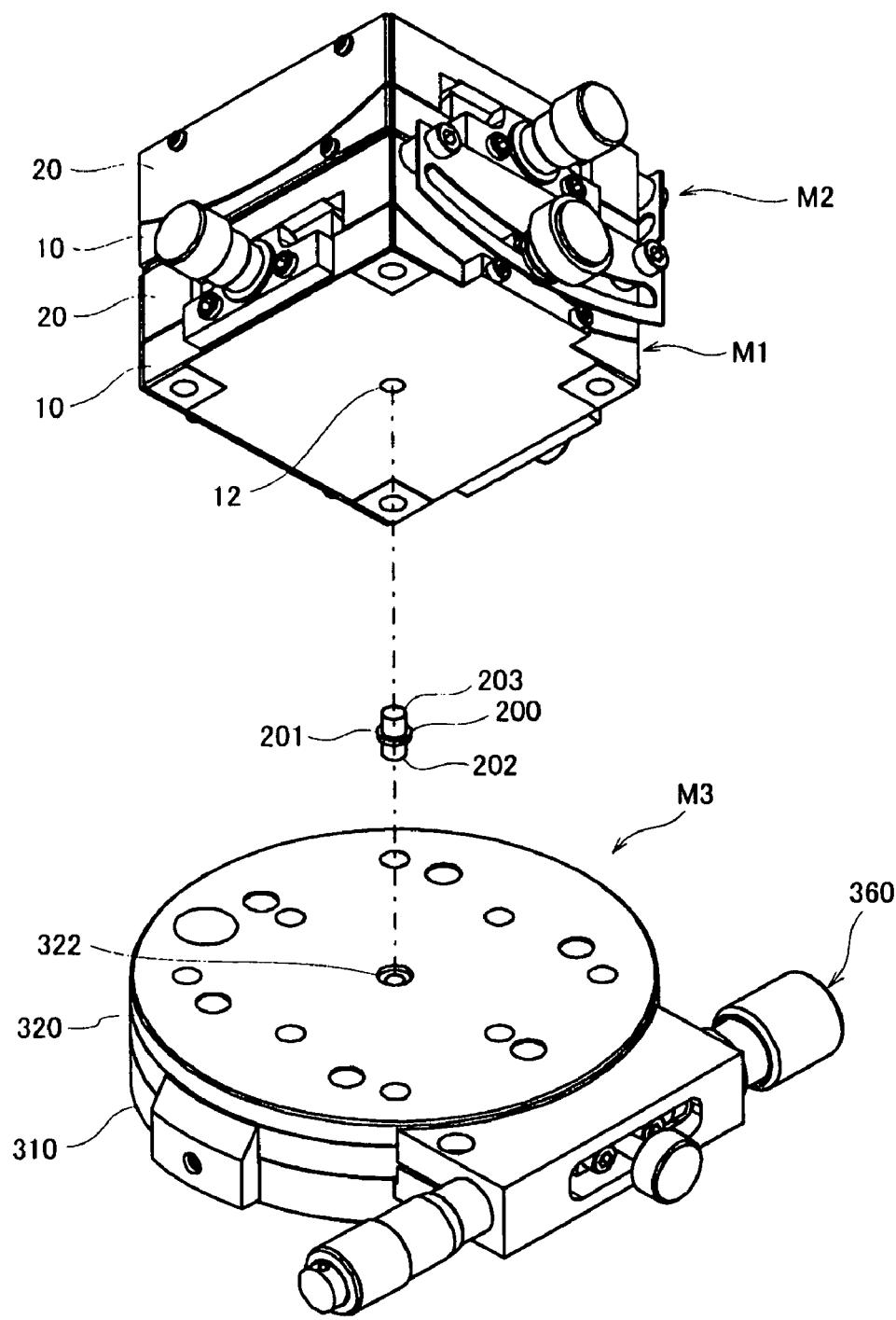
FIG. 27 is a perspective view in a state prior to assembly of a triaxial stage device comprising an additional θ-axis (rotating axis in the horizontal direction)
Figure 28:
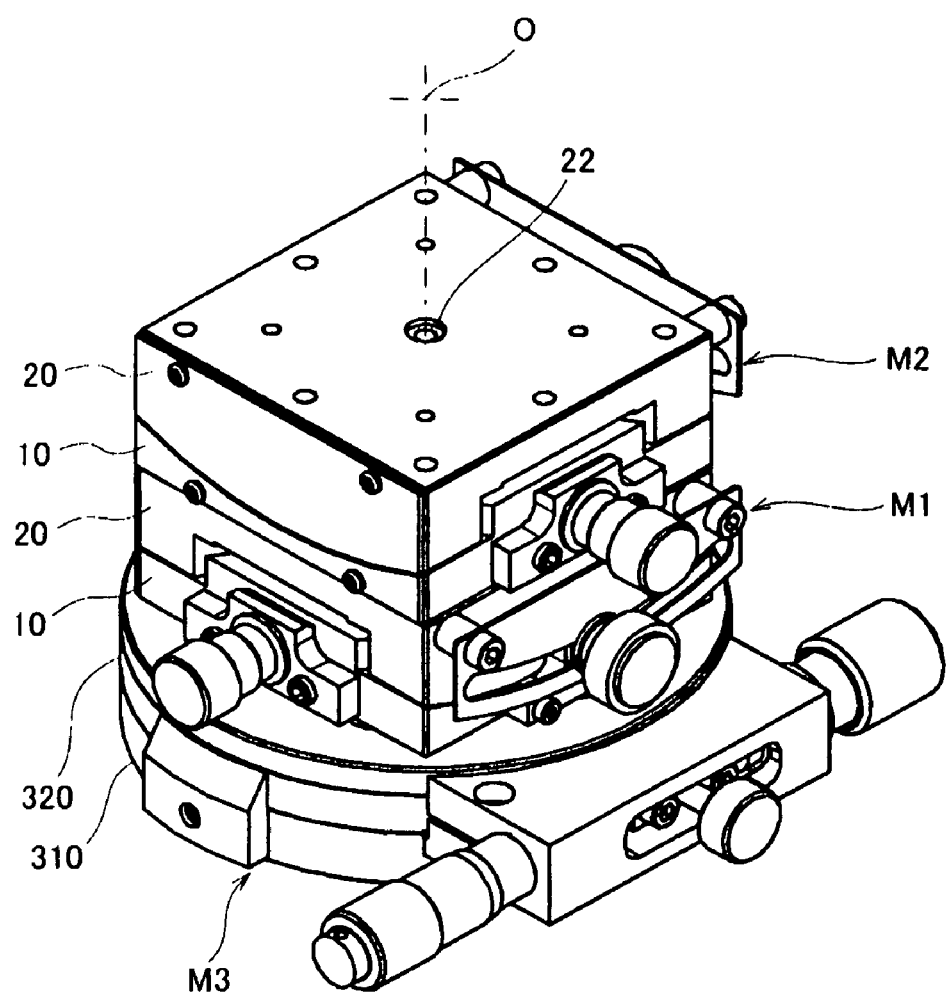
FIG. 28 is an external perspective view following assembly of the triaxial circular arc stage device.
Figure 29:
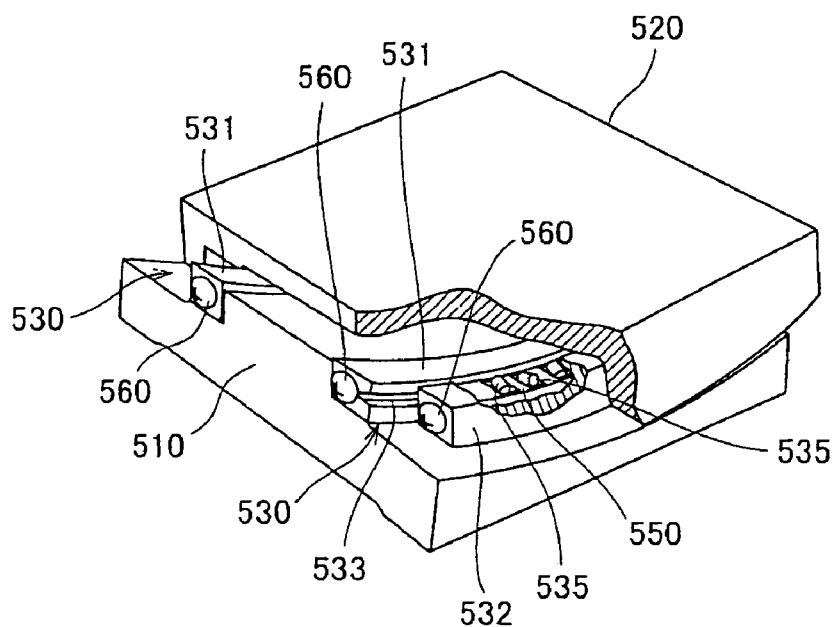
FIG. 29 is a perspective view of a conventional circular arc slide apparatus.
Figure 30:
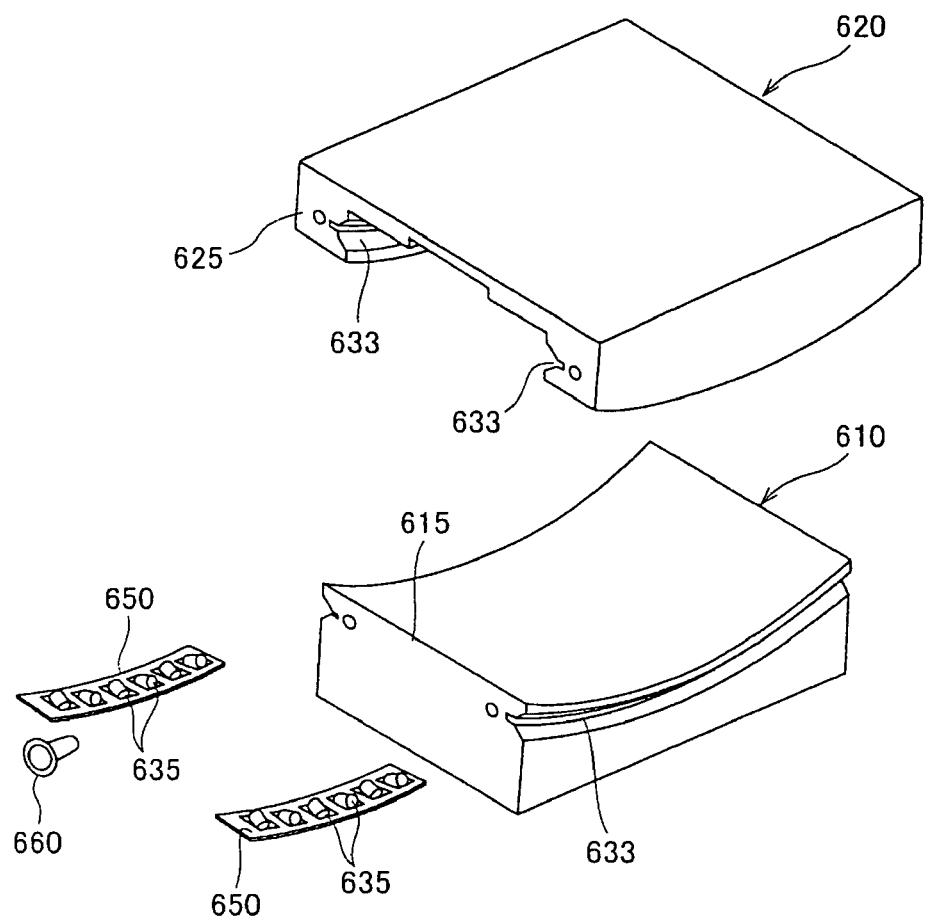
FIG. 30 is a perspective view of another conventional circular arc slide apparatus.

FIG. 27 is a perspective view of a state prior to the assembly of the θ-axis rotating stage device in the above-described biaxial stage device, and FIG. 28 is an external perspective view following assembly of a triaxial circular arc stage device (α-axis, β-axis, θ-axis).

This stage device is configured by mounting the above-described biaxial stage devices M1, M2 on the θ-axis rotating stage device M3. An upper plate 320 of this θ-axis rotating stage device M3 is rotatable in the horizontal direction on a lower plate 310, the position in the direction of rotation thereof being established by an operating mechanism 360.

As shown in FIG. 27, this assembly involves centering based on a lower half portion 202 of a pin 200 being inserted into a center reference hole 322 of the upper plate 320 of the θ-axis rotating stage device M3, and the upper half portion 203 of the pin 200 being inserted over the center reference hole 12 of the lower stage lower plate 10 of the circular arc stage device. As a result, an α-axis, β-axis, θ-axis triaxial stage device can be produced.

This assembly allows for the center axis to be positioned with the pin 200 inserted in the center reference holes 12, 22, 322 and, accordingly, ensures a simple and precise assembly.

What is claimed is:

1. A circular arc slide apparatus comprising:
 a lower plate;
 an upper plate assembled on the lower plate; and a circular arc track, provided between the lower plate and upper plate, for guiding the upper plate in a circular arc motion within a motion reference plane perpendicular to the lower plate, wherein mutually-insertable guide rail portions are provided in an upper surface of the lower plate and a lower surface of the upper plate, two sets of opposing planar surfaces parallel to the motion reference plane and mutually opposing in a direction orthogonal to the motion reference plane are provided in the guide rail portion of the lower plate and the guide rail portion of the upper plate, circular arc curve-shaped guide grooves which, by virtue of having respectively identical centers of curvature and radii of curvature, constitute the circular arc track are provided in the opposing planar surfaces, cross-sections of the mutually-opposing guide grooves are respectively formed in a circular arc shape defining a portion of a same circle, a plurality of balls of diameter corresponding to the cross-sectional shape of the two guide grooves are rollably fitted between the opposing guide grooves in a preloading state and, furthermore, the lower plate and the upper plate are integrally machined from a plate-like material and formed in a shape comprising the guide rail portions and guide grooves, and an inner surface of each of the guide grooves is configured from a machined surface produced by an end mill.

2. The circular arc slide apparatus as claimed in claim 1, wherein a depth of each of the guide grooves is set to a dimension, machinable by a tip semicircular cutting blade portion of an end mill in a state in which a tool rotation axis is set diagonally to an axis perpendicular to the opposing planar surfaces, that is not more than 0.146 times a diameter of the balls.

3. The circular arc slide apparatus as claimed in claim 2, wherein the two sets of mutually-opposing opposing planar surfaces are defined by an inner surface of the guide rail portion of one of either the upper plate or lower plate and by an outer surface of the guide rail portion of the other, the guide grooves being formed in the inner surface and the outer surface.

4. The circular arc slide apparatus as claimed in claim 2, wherein an escape groove for avoiding contact with a surface of the balls is provided in a groove base portion of the guide groove of circular arc-shaped cross-section.

5. The circular arc slide apparatus as claimed in claim 4, wherein the two sets of mutually-opposing opposing planar surfaces are defined by an inner surface of the guide rail portion of one of either the upper plate or lower plate and by an outer surface of the guide rail portion of the other, the guide grooves being formed in the inner surface and the outer surface.

6. The circular arc slide apparatus as claimed in claim 2, wherein the plurality of balls are rotatably supported, with a fixed interval maintained therebetween, by a plate-like retainer fitted in a space secured between the mutually-opposing opposing planar surfaces and a partial surface of each of the balls is exposed to an exterior through a window portion provided in two sides of the retainer, the balls coming into contact with an inner surface of the guide grooves at this exposed surface.

7. The circular arc slide apparatus as claimed in claim 6, wherein an escape groove for avoiding contact with a surface of the balls is provided in a groove base portion of the guide groove of circular arc-shaped cross-section.

8. The circular arc slide apparatus as claimed in claim 7, wherein the two sets of mutually-opposing opposing planar surfaces are defined by an inner surface of the guide rail portion of one of either the upper plate or lower plate and by an outer surface of the guide rail portion of the other, the guide grooves being formed in the inner surface and the outer surface.

9. The circular arc slide apparatus as claimed in claim 6, wherein the two sets of mutually-opposing opposing planar surfaces are defined by an inner surface of the guide rail portion of one of either the upper plate or lower plate and by an outer surface of the guide rail portion of the other, the guide grooves being formed in the inner surface and the outer surface.

10. The circular arc slide apparatus as claimed in claim 1, wherein an escape groove for avoiding contact with a surface of the balls is provided in a groove base portion of the guide groove of circular arc-shaped cross-section.

11. The circular arc slide apparatus as claimed in claim 10, wherein the two sets of mutually-opposing opposing planar surfaces are defined by an inner surface of the guide rail portion of one of either the upper plate or lower plate and by an outer surface of the guide rail portion of the other, the guide grooves being formed in the inner surface and the outer surface.

12. The circular arc slide apparatus as claimed in claim 1, wherein the two sets of mutually-opposing opposing planar surfaces are defined by an inner surface of the guide rail portion of one of either the upper plate or lower plate and by an outer surface of the guide rail portion of the other, the guide grooves being formed in the inner surface and the outer surface.

* * * * *